(12) United States Patent
Sant et al.

(10) Patent No.: US 12,247,303 B2
(45) Date of Patent: Mar. 11, 2025

(54) OXYGEN-SELECTIVE ANODES

(71) Applicant: The Regents of the University of California, Oakland, CA (US)

(72) Inventors: Gaurav Sant, Los Angeles, CA (US); Dante Adam Simonetti, Los Angeles, CA (US); Xin Chen, Los Angeles, CA (US); David Jassby, Los Angeles, CA (US); Erika Callagon La Plante, Los Angeles, CA (US); Steven Bustillos, Los Angeles, CA (US); Thomas J. Traynor, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 18/429,054

(22) Filed: Jan. 31, 2024

(65) Prior Publication Data

US 2024/0254640 A1 Aug. 1, 2024

Related U.S. Application Data

(60) Provisional application No. 63/442,298, filed on Jan. 31, 2023.

(51) Int. Cl.
| | |
|---|---|
| *C25B 11/00* | (2021.01) |
| *B01D 53/32* | (2006.01) |
| *B01D 53/62* | (2006.01) |
| *C01G 51/40* | (2025.01) |
| *C01G 55/00* | (2006.01) |
| *C25B 1/14* | (2006.01) |

(Continued)

(52) U.S. Cl.
CPC ........ *C25B 11/0775* (2021.01); *B01D 53/326* (2013.01); *B01D 53/62* (2013.01); *C01G 51/40* (2013.01); *C01G 55/00* (2013.01); *C25B 1/14* (2013.01); *C25B 11/075* (2021.01); *B01D 2257/504* (2013.01); *C01P 2002/52* (2013.01); *C01P 2004/84* (2013.01); *C01P 2006/40* (2013.01)

(58) Field of Classification Search
CPC .... C25B 11/00; C25B 11/075; C25B 11/0775
See application file for complete search history.

(56) References Cited

U.S. PATENT DOCUMENTS

| | | |
|---|---|---|
| 2,117,348 A | 5/1938 | Muskat |
| 2,802,719 A | 8/1957 | Avedikian |
| 4,318,996 A | 3/1982 | Magder |

(Continued)

FOREIGN PATENT DOCUMENTS

| | | |
|---|---|---|
| AU | 2005/290082 B2 | 3/2011 |
| CN | 111760436 A | 10/2020 |

(Continued)

OTHER PUBLICATIONS

Buck., "Alkali Reactivity of Strained Quartz as a Constituent of Concrete Aggregate," Aug. 1983, 17 pages.

(Continued)

*Primary Examiner* — Zulmariam Mendez
(74) *Attorney, Agent, or Firm* — Foley Hoag LLP; David P. Halstead; Alexander J. Chatterley

(57) ABSTRACT

The present disclosure relates to oxygen-selective anodes and methods for the use thereof.

30 Claims, 28 Drawing Sheets

(51) Int. Cl.
    *C25B 11/075*     (2021.01)
    *C25B 11/077*     (2021.01)

(56) References Cited

U.S. PATENT DOCUMENTS

| | | | |
|---|---|---|---|
| 4,379,870 | A | 4/1983 | Matsumoto |
| 4,391,680 | A | 7/1983 | Mani et al. |
| 4,432,666 | A | 2/1984 | Frey et al. |
| 4,452,635 | A | 6/1984 | Noshi et al. |
| 4,828,620 | A | 5/1989 | Mallow et al. |
| 5,366,598 | A * | 11/1994 | Hardee .......... C25D 17/10 205/532 |
| 5,435,846 | A | 7/1995 | Tatematsu et al. |
| 5,455,013 | A | 10/1995 | Shibata et al. |
| 5,518,540 | A | 5/1996 | Jones, Jr. |
| 5,744,078 | A | 4/1998 | Soroushian et al. |
| 5,798,328 | A | 8/1998 | Kottwitz et al. |
| 5,928,420 | A | 7/1999 | Oates et al. |
| 6,264,736 | B1 | 7/2001 | Knopf et al. |
| 6,569,923 | B1 | 5/2003 | Slagter |
| 7,413,014 | B2 | 8/2008 | Chatterji et al. |
| 7,691,249 | B2 * | 4/2010 | Daly .......... C02F 1/46104 205/100 |
| 7,879,305 | B2 | 2/2011 | Reddy et al. |
| 8,021,477 | B2 | 9/2011 | Brown et al. |
| 8,088,292 | B2 | 1/2012 | Neumann et al. |
| 8,163,066 | B2 | 4/2012 | Eisenberger |
| 8,252,242 | B2 | 8/2012 | Vandor |
| 8,262,777 | B2 | 9/2012 | Neumann et al. |
| 8,333,944 | B2 | 12/2012 | Constantz et al. |
| 8,383,072 | B2 | 2/2013 | Smedley et al. |
| 8,507,228 | B2 | 8/2013 | Simpson et al. |
| 8,852,319 | B2 | 10/2014 | Wijmans et al. |
| 8,864,876 | B2 | 10/2014 | Neumann et al. |
| 8,894,747 | B2 | 11/2014 | Eisenberger et al. |
| 9,061,237 | B2 | 6/2015 | Eisenberger et al. |
| 9,163,297 | B2 | 10/2015 | Langley |
| 9,205,371 | B2 | 12/2015 | Cooper et al. |
| 9,221,027 | B2 | 12/2015 | Kuppler et al. |
| 9,227,153 | B2 | 1/2016 | Eisenberger |
| 9,382,120 | B2 | 7/2016 | Dakhil |
| 9,382,157 | B2 | 7/2016 | Guzzetta et al. |
| 9,433,886 | B2 | 9/2016 | Smedley et al. |
| 9,440,189 | B2 | 9/2016 | Mercier et al. |
| 9,469,547 | B2 | 10/2016 | Kniesburges |
| 9,475,000 | B2 | 10/2016 | Benyahia |
| 9,492,945 | B2 | 11/2016 | Niven et al. |
| 9,555,365 | B2 | 1/2017 | Eisenberger et al. |
| 9,714,406 | B2 | 7/2017 | Constantz et al. |
| 9,786,940 | B2 | 10/2017 | Langley |
| 9,789,439 | B2 | 10/2017 | Siller et al. |
| 9,790,131 | B2 | 10/2017 | Lee et al. |
| 9,808,759 | B2 | 11/2017 | Balfe et al. |
| 9,861,931 | B2 | 1/2018 | Kuopanportti et al. |
| 10,010,829 | B2 | 7/2018 | Wright et al. |
| 10,017,739 | B2 | 7/2018 | Tedder et al. |
| 10,233,127 | B2 | 3/2019 | Atakan |
| 10,351,478 | B2 | 7/2019 | Quinn et al. |
| 10,392,305 | B2 | 8/2019 | Wang et al. |
| 10,668,443 | B2 | 6/2020 | Kuppler et al. |
| 10,781,140 | B2 | 9/2020 | Patten et al. |
| 10,968,142 | B2 | 4/2021 | Sant et al. |
| 11,040,898 | B2 | 6/2021 | Sant et al. |
| 11,230,473 | B2 | 1/2022 | Sant et al. |
| 11,339,094 | B2 | 5/2022 | Sant et al. |
| 11,384,029 | B2 | 7/2022 | Sant et al. |
| 12,042,765 | B2 | 7/2024 | Simonetti et al. |
| 2001/0023655 | A1 | 9/2001 | Knopf |
| 2002/0158018 | A1 | 10/2002 | Abramowitz et al. |
| 2002/0168473 | A1 | 11/2002 | Ottersbach |
| 2004/0077787 | A1 | 4/2004 | Karande |
| 2005/0238563 | A1 | 10/2005 | Eighmy et al. |
| 2006/0247450 | A1 | 11/2006 | Wu et al. |
| 2007/0186821 | A1 | 8/2007 | Brown et al. |
| 2007/0187247 | A1 | 8/2007 | Lackner et al. |
| 2008/0004449 | A1 | 1/2008 | Yong et al. |
| 2008/0156232 | A1 | 7/2008 | Crudden |
| 2008/0245274 | A1 | 10/2008 | Ramme |
| 2008/0245672 | A1 | 10/2008 | Little et al. |
| 2009/0081096 | A1 | 3/2009 | Pellegrin |
| 2009/0169452 | A1 | 7/2009 | Constantz et al. |
| 2009/0214408 | A1 | 8/2009 | Blake et al. |
| 2010/0059377 | A1 | 3/2010 | Littau et al. |
| 2010/0083880 | A1 | 4/2010 | Constantz et al. |
| 2010/0251632 | A1 | 10/2010 | Chen |
| 2010/0300894 | A1 | 12/2010 | Lin et al. |
| 2011/0006700 | A1 | 1/2011 | Chen et al. |
| 2011/0033239 | A1 | 2/2011 | Constantz et al. |
| 2011/0042230 | A1 | 2/2011 | Gilliam et al. |
| 2011/0174156 | A1 | 7/2011 | Saunders et al. |
| 2011/0268633 | A1 | 11/2011 | Zou |
| 2011/0290155 | A1 | 12/2011 | Vlasopoulos |
| 2012/0082839 | A1 | 4/2012 | Ha |
| 2013/0008355 | A1 | 1/2013 | Stokes |
| 2013/0036945 | A1 | 2/2013 | Constantz et al. |
| 2013/0058857 | A1 | 3/2013 | Stern et al. |
| 2014/0097557 | A1 | 4/2014 | Alhozaimy |
| 2014/0197563 | A1 | 7/2014 | Niven |
| 2014/0356267 | A1 | 12/2014 | Hunwick |
| 2015/0021184 | A1 | 1/2015 | Lin et al. |
| 2015/0225295 | A1 | 8/2015 | McCandlish et al. |
| 2016/0082387 | A1 | 3/2016 | Constantz et al. |
| 2016/0280598 | A1 | 9/2016 | Wang et al. |
| 2016/0362800 | A1 | 12/2016 | Ren et al. |
| 2017/0182458 | A1 | 6/2017 | Jiang et al. |
| 2017/0226021 | A1 | 8/2017 | Sant et al. |
| 2018/0238157 | A1 | 8/2018 | Fu et al. |
| 2018/0341887 | A1 | 11/2018 | Kislovskiy et al. |
| 2019/0027771 | A1 | 1/2019 | Feron et al. |
| 2019/0177220 | A1 | 6/2019 | Sant et al. |
| 2019/0232215 | A1 | 8/2019 | Fujita et al. |
| 2019/0233296 | A1 | 8/2019 | Novek |
| 2019/0367390 | A1 | 12/2019 | Sant et al. |
| 2020/0038803 | A1 | 2/2020 | Xu et al. |
| 2020/0062645 | A1 | 2/2020 | Gong et al. |
| 2020/0129916 | A1 | 4/2020 | Constantz et al. |
| 2020/0180964 | A1 | 6/2020 | Sant et al. |
| 2020/0299203 | A1 | 9/2020 | Sant et al. |
| 2021/0024364 | A1 | 1/2021 | Sant et al. |
| 2021/0031154 | A1 | 2/2021 | Nakamura et al. |
| 2021/0060484 | A1 | 3/2021 | Aziz et al. |
| 2021/0107840 | A1 | 4/2021 | Gong |
| 2021/0120750 | A1 | 4/2021 | Bourhis et al. |
| 2021/0162340 | A1 | 6/2021 | Constantz et al. |
| 2021/0188671 | A1 | 6/2021 | Sant et al. |
| 2021/0198157 | A1 | 7/2021 | Sant et al. |
| 2021/0262320 | A1 | 8/2021 | Nguyen et al. |
| 2021/0285111 | A1 | 9/2021 | Fernandez Sanchis et al. |
| 2021/0387139 | A1 | 12/2021 | Voskian et al. |
| 2021/0408553 | A1 * | 12/2021 | Abdul Jabbar ..... H01M 8/1213 |
| 2022/0064066 | A1 | 3/2022 | Sant et al. |
| 2022/0144673 | A1 | 5/2022 | Xiang et al. |
| 2022/0204401 | A1 | 6/2022 | Sant et al. |
| 2022/0212935 | A1 | 7/2022 | Sant et al. |
| 2022/0331740 | A1 | 10/2022 | Simonetti et al. |
| 2022/0380265 | A1 | 12/2022 | Sant et al. |
| 2023/0058065 | A1 | 2/2023 | Sant et al. |
| 2023/0120088 | A1 | 4/2023 | Sant et al. |
| 2023/0201774 | A1 | 6/2023 | Deng et al. |
| 2024/0018669 | A1 | 1/2024 | Simonetti et al. |

FOREIGN PATENT DOCUMENTS

| | | | |
|---|---|---|---|
| EP | | 2438977 B1 | 8/2014 |
| EP | | 3177384 A2 | 6/2017 |
| EP | | 3515879 A1 | 7/2019 |
| EP | | 3656750 A2 | 5/2020 |
| EP | | 3744700 A1 | 12/2020 |
| JP | | H05-294693 A | 11/1993 |
| JP | | H05-330878 A | 12/1993 |
| JP | | 2002-145650 A | 5/2002 |
| JP | | 6970469 B1 | 11/2021 |
| WO | WO-2000/060141 A1 | | 10/2000 |
| WO | WO-2008/018928 A2 | | 2/2008 |

(56) References Cited

FOREIGN PATENT DOCUMENTS

| | | |
|---|---|---|
| WO | WO-2009/078430 A1 | 6/2009 |
| WO | WO-2010/006242 A1 | 1/2010 |
| WO | WO-2014/005227 A1 | 1/2014 |
| WO | WO-2014/009802 A2 | 1/2014 |
| WO | WO-2015/112655 A2 | 7/2015 |
| WO | WO-2015/154174 A1 | 10/2015 |
| WO | WO-2016/022522 A2 | 2/2016 |
| WO | WO-2016/061251 A1 | 4/2016 |
| WO | WO-2018/011567 A1 | 1/2018 |
| WO | WO-2018/058139 A1 | 3/2018 |
| WO | WO-2018/081308 A1 | 5/2018 |
| WO | WO-2018/081310 A1 | 5/2018 |
| WO | WO-2019/006352 A1 | 1/2019 |
| WO | WO-2019/036386 A1 | 2/2019 |
| WO | WO-2019/036676 A1 | 2/2019 |
| WO | WO-2022/221665 A1 | 10/2022 |
| WO | WO-2023/069370 A1 | 4/2023 |
| WO | WO-2024/020027 A1 | 1/2024 |
| WO | WO-2024/163636 A1 | 8/2024 |

OTHER PUBLICATIONS

Communication Pursuant to Rules 70(2) and 70a(2) EPC on EP 18845904.4 dated Apr. 28, 2021.

Examination Report on IN 201927016758 dated Dec. 14, 2020 (5 pages).

Extended European Search Report for EP Application No. 17865241.8 dated May 15, 2020.

Extended European Search Report for EP Application No. 18845904.4 dated Apr. 7, 2021.

Final Office Action for U.S. Appl. No. 18/171,164 dated Sep. 29, 2023.

Final Office Action for U.S. Appl. No. 15/519,524 dated Nov. 21, 2019.

Final Office Action for U.S. Appl. No. 15/519,524 dated Oct. 14, 2020.

Glushkov et al., "Composition of gas produced from the direct combustion and pyrolysis of biomass", Process Safety and Environmental Protection, V. 156, 2021, pp. 43-56.

Iizuka et al., "Carbon dioxide recovery from carbonate solutions using bipolar membrane electrodialysis", Separation and purification technology 101: 49-59 (2012).

International Preliminary Report on Patentability for International Application No. PCT/US2017/058359 dated May 9, 2019.

International Preliminary Report on Patentability for International Application No. PCT/US2018/040373 dated Jan. 9, 2020.

International Preliminary Report on Patentability for International Application No. PCT/US2018/046557 dated Feb. 27, 2020.

International Search Report and Written Opinion for International Application No. PCT/US2015/055564 dated Jan. 22, 2016.

International Search Report and Written Opinion for International Application No. PCT/US2017/058359 dated Jan. 9, 2019.

International Search Report and Written Opinion for International Application No. PCT/US2018/040373 dated Sep. 20, 2018.

International Search Report and Written Opinion for International Application No. PCT/US2018/046557 dated Dec. 17, 2018.

International Search Report and Written Opinion for International Application No. PCT/US2023/013350 dated Jun. 15, 2023.

International Search Report and Written Opinion for International Application No. PCT/US2023/018395 dated Sep. 15, 2023.

International Search Report and Written Opinion for International Application No. PCT/US2023/024217 dated Oct. 9, 2023.

International Search Report and Written Opinion for International Application No. PCT/US2024/013806 dated May 30, 2024.

La Plante et al., "Controls on CO2 Mineralization Using Natural and Industrial Alkaline Solids under Ambient Conditions", ACS Sustainable Chem. Eng., 9(32), pp. 10727-10739, 2021.

Li et al., "pH control using polymer-supported phosponic acids as reusable buffer agents," Green Chem., 2015, vol. 17, pp. 3771-3774.

Mehdipour et al., "How Microstructure and Pore Moisture Affect Strength Gain in Portlandite-Enriched Composites That Mineralize CO2", ACS Sustainable Chem. Eng., 7(15), pp. 13053-13061, 2019.

Mehdipour et al., "The role of gas flow distributions on CO2 mineralization within monolithic cemented composites: coupled CFD-factorial design approach", Reaction Chemistry & Engineering 6 (3), pp. 494-504, 2021.

Murnandari et al., "Effect of process parameters on the CaCO3 production in the single process for carbon capture and mineralization", Korean Journal of Chemical Engineering, Mar. 2017, vol. 34, Issue 3, pp. 935-941.

Nagasawa et al., "A new recovery process of carbon dioxide from alkaline carbonate solution via electrodialysis", AIChE journal 55.12: 3286-3293 (2009).

Non-Final Office Action for U.S. Appl. No. 18/171,164 dated Jun. 6, 2023.

Non-Final Office Action for U.S. Appl. No. 15/519,524 dated May 16, 2019.

Non-Final Office Action on U.S. Appl. No. 15/519,524 dated Apr. 29, 2020, 12 pages.

Notice of Allowance for U.S. Appl. No. 15/519,524 dated Feb. 2, 2021.

Office Action for CN Application No. 201780076640.2 dated May 7, 2021.

Ramasubramanian et al., "Membrane processes for carbon capture from coal-fired power plant flue gas: A modeling and cost study," Journal of Membrane Science (2012) 421-422: 299-310.

Reddy et al., "Simultaneous capture and mineralization of coal combustion flue gas carbon dioxide (CO2)," Energy Procedia, 4, (2011), pp. 1574-1583.

Stolaroff et al., "Carbon dioxide capture from atmospheric air using sodium hydroxide spray", Environmental science & technology 42.8: 2728-2735 (2008).

Technical Data Sheet fumasep © FBM, from Fumasep available online at https://www.bwt.com/en/-/media/bwt/fumatech/datasheets/new/fumasep/water-treatment-processes/fumasep-fbm-wet-formv22.pdf, accessed on Mar. 6, 2024 (Year: 2024).

Vega-Vila et al. "Metal cations as inorganic structure-directing agents during the synthesis of phillipsite and tobermorite", Reaction Chemistry and Engineering, Mar. 1, 2023, 8, pp. 1176-1184.

Wang et al., "Integration of CO2 capture and storage based on pH-swing mineral carbonation using recyclable ammonium salts," Energy Procedia 4, 2011, 4930-4936.

Wei et al., "Clinkering-Free Cementation by Fly Ash Carbonation", Journal of CO2 Utilization, 23, pp. 117-127, 2018.

Abbasi et al., "An investigation of the effect of RuO2 on the deactivation and corrosion mechanism of a Ti/IrO2+ Ta2O5 coating in an OER application", *journal of Electroanalytical Chemistry* 777: 67-74 (2016).

Adenier et al., "Electrochemical Oxidation of Aliphatic Amines and Their Attachment to Carbon and Metal Surfaces," Langmuir, 20: 8243-8253 (2004).

Ahmad et al., "CO2 removal using membrane gas absorption with PVDF membrane incorporated with POSS and SAPO-34 zeolite", *Chemical Engineering Research and Design* 118: 238-247 (2017).

Arshad et al., "Equilibrium Solubility of CO2 in Alkanolamines," DTU Libraryy: 5 pages (2013).

Dutcher et al., "Amine-Based CO2 Capture Technology Development from the Beginning of 2013—A Review," Applied Materials & Interfaces, 7: 2137-2148 (2015).

Eisaman et al., "CO2 separation using bipolar membrane electrodialysis," Energy & Environmental Science, 4: 1319-1328 (2011).

Erans et al., "Direct air capture: process technology, technoeconomic and socio-political challenges," Energy & Environmental Science, 15: 1360-1405 (2022).

Falzone et al., "New insights into the mechanisms of carbon dioxide mineralization by portlandite", AIChE Journal 67(5): e17160 (2021).

Fujimura et al., "Oxygen evolution on manganese-molybdenum oxide anodes in seawater electrolysis", *Materials Science and Engineering: A* 267.2: 254-259 (1999).

(56) References Cited

OTHER PUBLICATIONS

Hashimoto et al., "Advanced materials for global carbon dioxide recycling", *Materials Science and Engineering: A* 304: 88-96 (2001).
Husebye et al., "Techno economic evaluation of amine based CO2 capture: impact of CO2 concentration and steam supply," Energy Procedia, 23: 381-390 (2012).
International Search Report and Written Opinion for Application No. PCT/US2022/025028 dated Jul. 13, 2022.
International Search Report and Written Opinion for International Application No. PCT/US2022/046917 dated Feb. 8, 2023.
International Search Report and Written Opinion for International Application No. PCT/US2023/028023 dated Nov. 8, 2023.
Ivy., "Summary of Electrolytic Hydrogen Production Milestone Completion Report," National Renewable Energy Laboratory: 27 pages (2004).
Keith et al., "A Process for Capturing CO2 from the Atmosphere," Joule, 2: 1573-1594 (2018).
Keith et al., "Climate Strategy with CO2 Capture From The Air," Climatic Changes: 29 pages (2005).
Kiani et al., "Techno-economic assessment for CO2 capture from air using a conventional liquid-based absorption process," Frontiers in Energy Research 8: 92 (2020).
La Plante et al. "Electrolytic seawater mineralization and how it ensures (net) carbon dioxide removal", Submitted to ACS ES&T Engineering, Jan. 2023, 23 pages.
Liu et al., "Electrochemically mediated carbon dioxide separation with quinone chemistry in salt-concentrated aqueous media," Nature Communications, 11: Article No. 2278 pp. 1-11 (2020).
Lv et al., "Mechanisms of CO2 Capture into Monoethanolamine Solution with Different CO2 Loading during the Absorption/Desorption Processes," Enviromental Science & Technology, 49: 10728-10735 (2015).
Macdowell et al., "An overview of CO2 capture technologies," Energy & Environmental Science, 3: 1645-1669 (2010).
Marshall et al., "A review of adhesion science", *Dental materials* 26.2: e11-e16 (2010).
Mccann et al., "Simulation of Ethalpy and Capacity of CO2 Absorption by Aqueous Amine Systems", Ind. Eng. Chem. Res., 47: pp. 2002-2009 (2008).
Mezza et al., "An Electrochemical Platform for the Carbon Dioxide Capture and Conversion to Syngas," Energies, 14: 7869 pp. 1-13 (2021).
Muroyama et al., "CO2 separation and transport via electrochemical methods", Journal of The Electrochemical Society 167.13: 133504 (2020).
Pal et al., "Adsorptive removal of heat stable salt anions from industrial lean amine solvent using anion exchange resins from gas sweetening unit," Journal of Natural Gas Science and Engineering 15(2013): pp. 14-21 (2013).
Rahimi et al., "Bench-scale demonstration of CO2 capture with an electrochemically driven proton concentration process," RSC Advances, 10: 16832 (2020).
Rau et al., "Direct electrolytic dissolution of silicate minerals for air CO2 mitigation and carbon-negative H2 production," PNAS, 110(25): 10095-10100 (2013).
Rinberg et al., "Alkalinity Concentration Swing for Direct Air Capture of Carbon Dioxide," ChemSusChem, 14: 1-16 (2021).
Roussanaly et al., "Techno-economic analysis of MEA CO2 capture from a cement kiln—impact of steam supply scenario," Energy Procedia, 114: 6229-6239 (2017).
Sabatino et al., "Evaluation of a Direct Air Capture Process Combining Wet Scrubbing and Bipolar Membrane Electrodialysis," Industrial & Engineering Chemistry Research, 59: 7007-7020 (2020).
Sakwattanapong et al., "Behavior of Reboiler Heat Duty for CO2 Capture Plants Using Regenerable Single and Blended Alkanolamines," Ind. Eng. Chem. Res., 44: 4465-4473 (2005).
Sanz-Pérez et al., "Direct Capture of CO2 from Ambient Air", Chem. Rev., 2016, vol. 116, pp. 11840-11876, 37 pages.
Shu et al., "Electrochemical Regeneration of Spent Alkaline Absorbent from Direct Air Capture," Environmental Science & Technology, 54: 8890-8998 (2020).
Stern et al., "Bench-scale demonstration of CO2 capture with electrochemically-mediated amine regeneration," RSC Advances, 4: 5906-5914 (2014).
Stern et al., "Post-combustion carbon dioxide capture using electrochemically mediated amine regeneration," Energy & Environmental Science, 6: 2505-2517 (2013).
Stripe Carbon Removal Purchase Application submitted Mar. 31, 2022.
Tang et al., "Advances in the application of manganese dioxide and its composites as electrocatalysts for the oxygen evolution reaction", *Journal of Materials Chemistry A* 8(36): 18492-18514 (2020).
Voskian et al., "Faradaic electro-swing reactive adsorption for CO2 capture," Energy & Environmental Science, 12: 3530-3547 (2019).
Wang et al. "Technoeconomic Analysis of the Electrochemically Mediated Amine Regeneration CO2 Capture Process" Ind. Eng. Chem. Res., 59: 14085-14095 (Year: 2020).
Wang et al., "CO2 Capture Using Electrochemically Mediated Amine Regeneration," Massachusetts Institute of Technology: 27 pages (2020).
Wang et al., "Energetics of electrochemically mediated amine regeneration process for flue gas CO2 capture," International Journal of Greenhouse Gas Control, 82: 48-58 (2019).
Wang et al., "Flue gas CO2 capture via electrochemically mediated amine regeneration: System design and performance," Applied Energy, 255: 113879 (2019).
U.S. Appl. No. 18/047,633, Pending.
U.S. Appl. No. 17/722,036, Pending.
U.S. Appl. No. 18/511,368, Pending.
U.S. Appl. No. 18/223,460, Pending.
Anantharaj et al., "Spinel cobalt titanium binary oxide as an all-non-precious water oxidation electrocatalyst in acid." *Inorganic Chemistry* 58.13 (2019): 8570-8576.
Arshad et al., "Equilibrium Solubility of CO2 in Alkanolamines," DTU Library: 5 pages (2013).
Balaji et al., "An alternative approach to selective sea water oxidation for hydrogen production." *Electrochemistry Communications* 11.8 (2009): 1700-1702.
Bennett, "Electrodes for generation of hydrogen and oxygen from seawater." *International Journal of Hydrogen Energy* 5.4 (1980): 401-408.
Bhardwaj et al., "Ultrathin silicon oxide overlayers enable selective oxygen evolution from acidic and unbuffered pH-neutral seawater." *ACS Catalysis* 11.3 (2021): 1316-1330.
Cheng et al., "Synergistic action of Co—Fe layered double hydroxide electrocatalyst and multiple ions of sea salt for efficient seawater oxidation at near-neutral pH." *Electrochimica Acta* 251 (2017): 336-343.
Choi et al., "A Reflection on Sustainable Anode Materials for Electrochemical Chloride Oxidation." *Advanced Materials* 35.43 (2023): 2300429.
De Lannoy et al., "Indirect ocean capture of atmospheric CO2: Part I. Prototype of a negative emissions technology." *International journal of greenhouse gas control* 70 (2018): 243-253.
El-Moneim et al., "Mn—Mo—Sn oxide anodes for oxygen evolution in seawater electrolysis for hydrogen production." *ECS Transactions* 25.40 (2010): 127.
El-Moneim et al., "Nanocrystalline manganese-molybdenum-tungsten oxide anodes for oxygen evolution in acidic seawater electrolysis." *Materials transactions* 46.2 (2005): 309-316.
El-Moneim, "Mn—Mo—W-oxide anodes for oxygen evolution during seawater electrolysis for hydrogen production: effect of repeated anodic deposition." international journal of hydrogen energy 36.21 (2011): 13398-13406.
Escudero-Escribano et al. "Importance of surface IrO x in stabilizing RuO2 for oxygen evolution." *The Journal of Physical Chemistry B* 122.2 (2018): 947-955.
Frydendal et al., "Toward an active and stable catalyst for oxygen evolution in acidic media: Ti-stabilized MnO2." *Advanced Energy Materials* 5.22 (2015): 1500991.

(56) References Cited

OTHER PUBLICATIONS

Fujimura et al., "Anodically deposited manganese-molybdenum oxide anodes with high selectivity for evolving oxygen in electrolysis of seawater." *Journal of Applied Electrochemistry* 29 (1999): 769-775.

Fujimura et al., "The durability of manganese-molybdenum oxide anodes for oxygen evolution in seawater electrolysis." *Electrochimica acta* 45.14 (2000): 2297-2303.

Gayen et al., "Selective seawater splitting using pyrochlore electrocatalyst." *ACS Applied Energy Materials* 3.4 (2020): 3978-3983.

Hashimoto et al., "New nanocrystalline manganese-molybdenum-tin oxide anodes for oxygen evolution in seawater electrolysis." *ECS Transactions* 1.4 (2006): 491-497.

Hine et al., "Electrochemical Behavior of the Oxide-Coated Metal Anodes." *Journal of the Electrochemical Society* 126.9 (1979): 1439.

Huynh et al., "A functionally stable manganese oxide oxygen evolution catalyst in acid." *Journal of the American Chemical Society* 136.16 (2014): 6002-6010.

Huynh et al., "Design of template-stabilized active and earth-abundant oxygen evolution catalysts in acid." *Chemical science* 8.7 (2017): 4779-4794.

Huynh et al., "Nature of activated manganese oxide for oxygen evolution." *Journal of the American Chemical Society* 137.47 (2015): 14887-14904.

Izumiya et al., "Anodically deposited manganese oxide and manganese-tungsten oxide electrodes for oxygen evolution from seawater." *Electrochimica Acta* 43.21-22 (1998): 3303-3312.

Izumiya et al., "Mn—W oxide anodes prepared by thermal decomposition for oxygen evolution in seawater electrolysis." *Materials transactions, JIM* 39.2 (1998): 308-313.

Izumiya et al., "Surface activation of manganese oxide electrode for oxygen evolution from seawater." *Journal of applied electrochemistry* 27 (1997): 1362-1368.

Kato et al., "Electrochemical characterization of degradation of oxygen evolution anode for seawater electrolysis." *Electrochimica Acta* 116 (2014): 152-157.

Kato et al., "Durability enhancement and degradation of oxygen evolution anodes in seawater electrolysis for hydrogen production." *Applied surface science* 257.19 (2011): 8230-8236.

Kwong et al., "Cobalt-doped hematite thin films for electrocatalytic water oxidation in highly acidic media." *Chemical Communications* 55.34 (2019): 5017-5020.

Kwong et al., "High-performance iron (III) oxide electrocatalyst for water oxidation in strongly acidic media." *Journal of Catalysis* 365 (2018): 29-35.

La Plante et al., "Electrolytic Seawater Mineralization and the Mass Balances That Demonstrate Carbon Dioxide Removal." ACS ES&T Engineering (2023).

Li et al., "Enhancing the stability of cobalt spinel oxide towards sustainable oxygen evolution in acid." *Nature Catalysis* 5.2 (2022): 109-118.

Li et al., "Oxygen evolution and corrosion behaviours of the porous $Mn_5Si_3$ electrode in sulfuric acid." *Materials Research Express* 6.8 (2019): 085542.

Li et al., "Stable potential windows for long-term electrocatalysis by manganese oxides under acidic conditions." *Angewandte Chemie* 131.15 (2019): 5108-5112.

Lv et al., "Mechanisms of $CO_2$ Capture into Monoethanolamine Solution with Different $CO_2$ Loading during the Absorption/Desorption Processes," Environmental Science & Technology, 49: 10728-10735 (2015).

Matsui et al., "Anodically deposited manganese-molybdenum-tungsten oxide anodes for oxygen evolution in seawater electrolysis." *Journal of applied electrochemistry* 32 (2002): 993-1000.

McCann et al., "Simulation of Enthalpy and Capacity of $CO_2$ Absorption by Aqueous Amine Systems", Ind. Eng. Chem. Res., 47: pp. 2002-2009 (2008).

McCrory et al., "Benchmarking heterogeneous electrocatalysts for the oxygen evolution reaction." *Journal of the American Chemical Society* 135.45 (2013): 16977-16987.

Minke et al., "Is iridium demand a potential bottleneck in the realization of large-scale PEM water electrolysis?." *international journal of hydrogen energy* 46.46 (2021): 23581-23590.

Moreno-Hernandez, Ivan A., et al. "Crystalline nickel manganese antimonate as a stable water-oxidation catalyst in aqueous 1.0 MH $2$ SO $4$." *Energy & Environmental Science* 10.10 (2017): 2103-2108.

Okada et al., "A bilayer structure composed of Mg| Co—$MnO_2$ deposited on a Co (OH) 2 film to realize selective oxygen evolution from chloride-containing water." *Langmuir* 36.19 (2020): 5227-5235.

Pan et al., "Efficient and stable noble-metal-free catalyst for acidic water oxidation." *Nature communications* 13.1 (2022): 2294.

Retuerto et al., "Highly active and stable OER electrocatalysts derived from $Sr_2MIrO_6$ for proton exchange membrane water electrolyzers." *Nature Communications* 13.1 (2022): 7935.

Seh et al., "Combining theory and experiment in electrocatalysis: Insights into materials design." *Science* 355.6321 (2017): eaad4998.

Seitz et al., "A highly active and stable $IrO_x/SrIrO_3$ catalyst for the oxygen evolution reaction." Science 353.6303 (2016): 1011-1014.

Tong et al., "Electrolysis of low-grade and saline surface water." *Nature Energy* 5.5 (2020): 367-377.

Vos et al., "$MnO_x/IrO_x$ as selective oxygen evolution electrocatalyst in acidic chloride solution." *Journal of the American Chemical Society* 140.32 (2018): 10270-10281.

Wu et al., "Non-iridium-based electrocatalyst for durable acidic oxygen evolution reaction in proton exchange membrane water electrolysis." *Nature Materials* 22.1 (2023): 100-108.

Xu et al., "Calcination temperature dependent catalytic activity and stability of $IrO_2$—$Ta_2O_5$ anodes for oxygen evolution reaction in aqueous sulfate electrolytes." *Journal of The Electrochemical Society* 164.9 (2017): F895-F900.

Xu et al., "Electrogeneration of hydrogen peroxide using Ti/$IrO_2$—$Ta_2O_5$ anode in dual tubular membranes Electro-Fenton reactor for the degradation of tricyclazole without aeration." *Chemical Engineering Journal* 295 (2016): 152-159.

Yang et al., "Highly acid-durable carbon coated $Co_3O_4$ nanoarrays as efficient oxygen evolution electrocatalysts." *Nano Energy* 25 (2016): 42-50.

Yu et al., "Sustainable oxygen evolution electrocatalysis in aqueous 1 M $H_2SO_4$ with earth abundant nanostructured $Co_3O_4$." *Nature communications* 13.1 (2022): 4341.

Zhao et al., "Charge state manipulation of cobalt selenide catalyst for overall seawater electrolysis." *Advanced Energy Materials* 8.29 (2018): 1801926.

Zheng, "Binary platinum alloy electrodes for hydrogen and oxygen evolutions by seawater splitting." *Applied Surface Science* 413 (2017): 72-82.

Zheng, "Pt-free NiCo electrocatalysts for oxygen evolution by seawater splitting." *Electrochimica Acta* 247 (2017): 381-391.

Zhou et al., "Rutile alloys in the Mn—Sb—O system stabilize $Mn^{3+}$ to enable oxygen evolution in strong acid." *Acs Catalysis* 8.12 (2018): 10938-10948.

Vos et al., "Selectivity Trends Between Oxygen Evolution and Chlorine Evolution on Iridium-Based Double Perovskites in Acidic Media," ACS Catalysis 9 (2019): 8561-8574.

\* cited by examiner

Double-layered structure

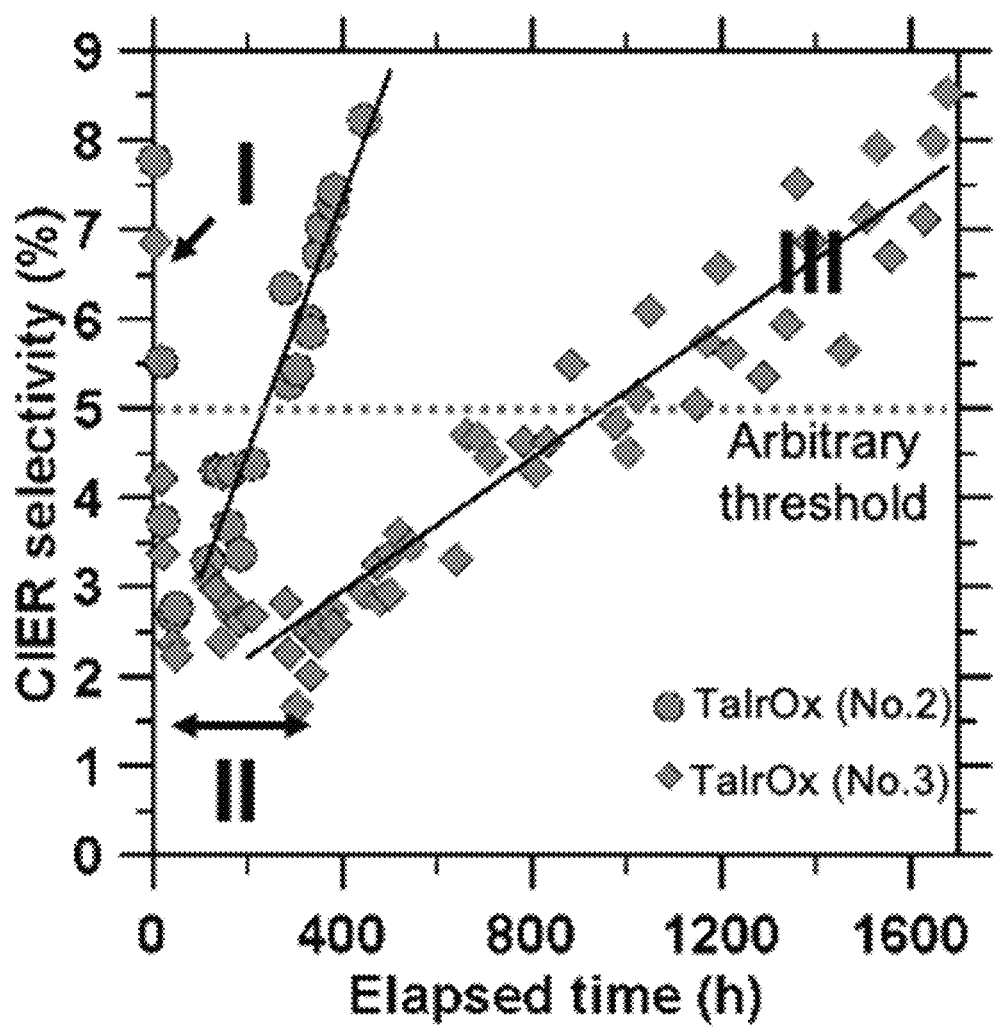

FIGURE 23A
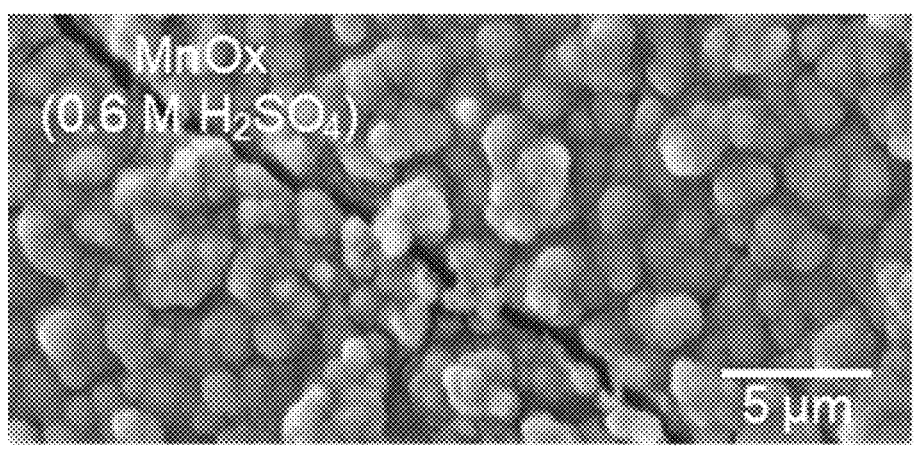
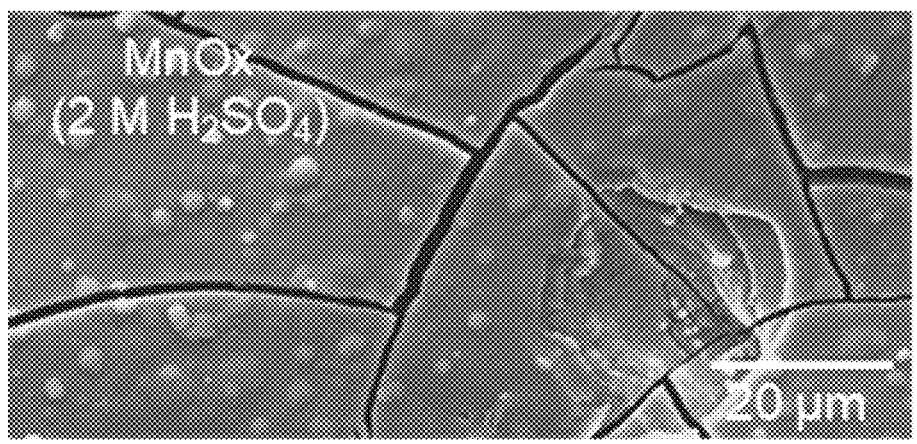

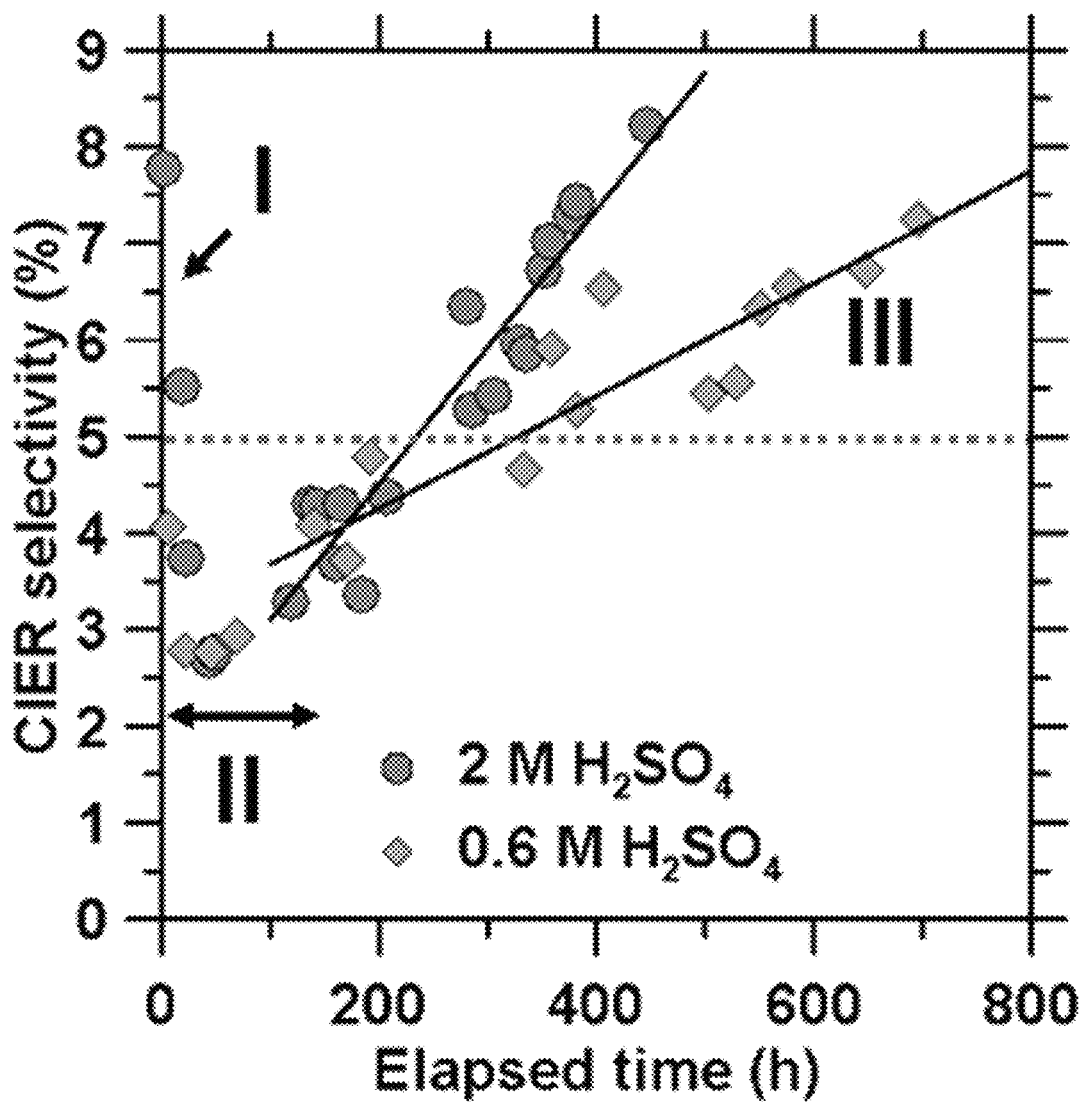

OXYGEN-SELECTIVE ANODES

CROSS-REFERENCE TO RELATED APPLICATIONS

This application claims the benefit of priority to U.S. Provisional Application No. 63/442,298, filed Jan. 31, 2023, the contents of which are herein incorporated by reference in their entirety.

STATEMENT OF GOVERNMENT SUPPORT

This invention was made with government support under DE-AR0001551 awarded by the U.S. Department of Energy. The government has certain rights in the invention.

BACKGROUND

Efficient and cost-effective means of sequestering $CO_2$, such as by mineralization, are highly desired as a critical component of combating global climate change. Alkaline solutions are known to react with $CO_2$ sources to produce $HCO_3^-$ and $CO_3^{2-}$ species, which may be isolated dissolved species, or as stable solids, but there are a number of challenges to large-scale $CO_2$ sequestration using alkaline solutions including cost of the alkalinizing reagents. As an alternative, alkaline solutions may be prepared efficiently using water electrolysis, and separation of the resultant $H^+$ (acidic) and $OH^-$ (basic) species into acidic and basic solutions. However, the chlorine evolution reaction (CIER) occurs favorably in solutions comprising $Cl^-$ ions, such as naturally occurring brines or seawater. The undesired CIER occurring in competition with the desired oxygen evolution reaction (OER) hinders the development of such processes for large-scale $CO_2$ capture and removal. As such, there exists a need for electrolytic systems for $CO_2$ capture and removal which mitigate the unwanted production of free chlorine species and chlorine gas.

SUMMARY OF THE INVENTION

In certain aspects, provided herein are oxygen-selective anodes. In further aspects, provided herein are methods of electrolyzing saline solutions, wherein an oxygen-selective anode (OSA) is employed.

BRIEF DESCRIPTION OF THE DRAWINGS

FIG. 22C shows ALT performance of PGM-based anodes with different substrates under constant voltage. The anode with the higher substrate Ir loading (anode substrate 3) showed significantly better performance as compare to anode substrate 2, which had a lower substrate Ir loading.

FIG. 23A shows SEM images of the surfaces of exemplary MnOx-coated PGM-based electrodes (with anode substrate 2) plated in 0.6 M $H_2SO_4$ (top) or 2 M $H_2SO_4$ (bottom).

FIG. 23B shows ALT performances of the MnOx-coated PGM-based electrode (anode substrate 2) plated in either 0.6 M $H_2SO_4$ or 2 M $H_2SO_4$.

DETAILED DESCRIPTION OF THE INVENTION

Figure 1:
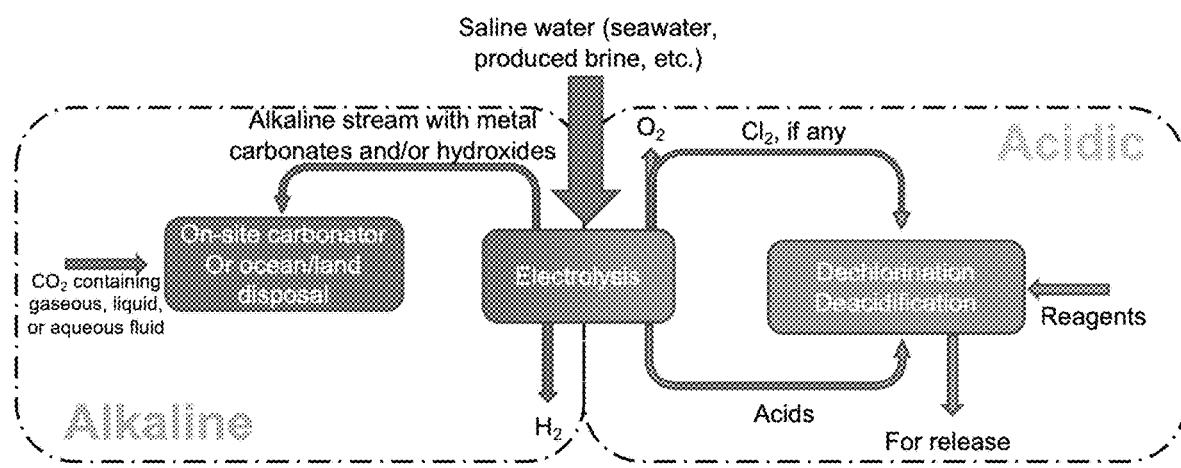
FIG. 1 shows a simplified block flow diagram showing saline water electrolysis as a carbon removal pathway.

Electrochemical saline water alkalinization is a transformative approach for $CO_2$ removal. For instance, seawater electrolysis-mediated carbon immobilization exploits: (i) the ocean-atmosphere equilibrium of gas-phase and dissolved $CO_2$ (e.g., ~2 mM dissolved inorganic carbon (DIC)), and (ii) the large abundance of divalent alkaline cations in seawater (e.g., 55 mM $Mg^{2+}$ or 10.5 mM $Ca^{2+}$). These attributes can be leveraged to electrochemically force carbonate and hydroxide mineral formation (e.g., Ca—, Mg- carbonates, hydroxides, and their variants), which consumes dissolved $CO_2$ and absorbs additional atmospheric $CO_2$ as carbonates/bicarbonates. Electrolytic alkalinization may be affected without the need for costly alkali additives (e.g., NaOH), but instead by the electrochemical pH-swing of saline water in the proximity of flow-through electrode surfaces that produce hydroxide ions (OH) and promote heterogencous and homogeneous nucleation and growth of carbonate and hydroxide mineral precipitates. However, saline water electrolysis is usually accompanied by the oxidation of chloride ions and the formation of free chlorine species (e.g., $Cl_2$, $ClO^-$, or HClO), which occurs on the anode. Unless these species can be collected prior to discharge of electrolyzer effluents, chlorine oxidation is in general harmful and should be suppressed. Herein are provided methods and systems for the immobilization of $CO_2$ as solid and aqueous carbonate and bicarbonate species while inhibiting chloride ion oxidation reactions via 1) upstream strategies such as using oxygen evolution reaction (OER)-selective anodes, and/or 2) down-stream strategies such as chlorine scavenging processes. An exemplary, simplified flow diagram is denoted in FIG. 1, and the detailed strategies are respectively established on the catholyte (alkaline) and anolyte (acidic) sides.

Direct seawater electrolysis selective against unwanted ClER, has been attempted and reported over the years. In summary, ClER suppression is generally enabled by designing anode catalysts following two pathways: 1) low-overpotential anodes that can be operated below the ClER kick-off potential, and 2) $Cl^-$-blocking anodes that screen $Cl^-$ from the water-splitting surface.

The low-overpotential anodes take advantage of the fact that ClER (Equation 1) requires a slightly higher thermodynamic (TD) potential than the desired OER (Equation 2) to take place.

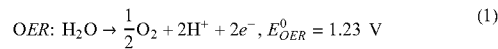

$$OER: H_2O \rightarrow \frac{1}{2}O_2 + 2H^+ + 2e^-, E^0_{OER} = 1.23 \text{ V} \tag{1}$$

$$ClER: 2Cl^- + 2e^- \rightarrow Cl_2, E^0_{ClER} = 1.35 \text{ V} \tag{2}$$

At the seawater $Cl^-$ concentration (~0.5M), the TD potentials of ClER and OER exhibit a gap of ~0.2-0.3 V at an acidic pH of 0-3. This gap is maximized at pH >7.5 to ~0.48 V. Although metal oxide electrocatalysts have been developed that show promising overpotentials, such a pathway is limited by low current densities (i.e., <10 A/m²), and only neutral to alkaline pHs. When used in acidic conditions, most of the metal oxides are unstable. Additionally, due to the reduction in potential gaps to <0.3 V, the overpotential of even PGM catalysts (platinum group metals, e.g., IrOx) is too high to permit OER selectivity.

Alternatively, a $Cl^-$-blocking anode is achieved by double-layered coatings, e.g., by overlaying a $Cl^-$-blocking on an OER-catalyzing layer. The $Cl^-$-blocking outer layer usually comprises negatively charged materials that repel the negatively charged $Cl^-$ ion, while letting water, oxygen, and cationic species ($Na^+$, $H^+$, etc.) pass through the outer layer to the active layers beneath. A number of anodes have been demonstrated to possess high OER-selectivity, most of which contain a $Cl^-$-blocking overlayer composed of Manganese oxides (MnOx). Others use Nafion or Si- and Ni-hydroxides which play a similar $Cl^-$ blocking role to MnOx.

TABLE 1

Compositions and relevant properties of other known anodes.

| Ref | Catalysts summary (substrate/inner layer/ outer layer) | OER selectivity (%) | Durability | Electrolyte | Acid addition (Y/N) | $Cl^-$ addition (Y/N) |
|---|---|---|---|---|---|---|
| 4 | Ti/SnIrOx/ MnMoSnOx | 99 | 4000 h @ 1000 A/m² | 0.5 m NaCl at pH 1 | Y | Y |
| 5 | Ti/SnIrSbOx/ MnMoSnOx | 98 | 3400 h @ 1000 A/m² | 0.5 m NaCl at pH 2 | Y | Y |
| 6 | Ti/IrO₂/MnMoOx | 96.5 | 2800 h @ 1000 A/m² | 0.5M NaCl pH 8 | N | Y |
| 7 | Ti/IrO₂/MnMoWOx | 99 | 2600 h @ 1000 A/m² | 0.5M NaCl pH 8.7 | N | Y |
| 8 | Ti/SnIrSbOx/ $Mn_{0.92}Mo_{0.07}Sn_{0.01}O_{2.07}$ | 97.5 | 2400 h @ 1000 A/m² | 0.5M NaCl | N | Y |
| 9 | Ti/IrO₂/MnMoSnOx | 94 | 2000 h @ 1000 A/m² | 0.5M NaCl pH 8.7 | N | Y |
| 10 | Ti/IrO₂/ $Mn_{0.8}Mo_{0.05}W_{0.06}O_{2.11}$ | 99.7 | 800 h @ 1000 A/m² | 0.5M NaCl pH 8 | N | Y |
| 11 | Ti/IrO2/MnMoWOx | >99 | 192 h @ 1000 A/m² | 0.5 m NaCl at pH 2 | Y | Y |
| 12 | IrOx/SrIrO₃ | N.A. | 30 h @ | 0.5M $H_2SO_4$ | Y | N |

TABLE 1-continued

Compositions and relevant properties of other known anodes.

| Ref | Catalysts summary (substrate/inner layer/ outer layer) | OER selectivity (%) | Durability | Electrolyte | Acid addition (Y/N) | Cl⁻ addition (Y/N) |
|---|---|---|---|---|---|---|
| 13 | Ti/PtPd | N.A. | 100 A/m² 12 h @ 1000 A/m² | Seawater | N | N |
| 14 | Pt coated with Si | N.A. | 12 h @ 2 A/m² | 0.5M KHSO₄ + 0.6M KCl | N | Y |
| 15 | GC/IrO₂/Nafion | 100 | 0.5 h @ 5000 A/m² | 0.5M NaCl pH 8.3 | N | Y |
| 16 | HF treated Ti/ $Sn_{0.16}Ir_{0.84}O_2$/ $Mn_{0.929}Mo_{0.067}Sn0_{0.004}O_{2.067}$ | 99 | 430 h @ 2000 A/m² | 0.5 m NaCl at pH 1 | Y | Y |
| 17 | Ti/IrO₂/MnWOx | 99.6 | N.A. | 0.5M NaCl 0.01M NaOH for alternate the pH to 8 | N | Y |
| 18 | Ti/IrO₂/MnWOx | 70 | N.A. | 0.5M NaCl 0.01M NaOH for alternate the pH to 8 | N | Y |
| 19 | Ti/IrO₂/MnZnOx | 86 | N.A. | 0.5M NaCl 0.01M NaOH for alternate the pH to 8.3 | N | Y |
| 20 | GC/IrO₂/MnOx | 82 | N.A. | 30 mM Cl⁻ | N | Y |
| 21 | Ti/MnO₂ | N.A. | N.A. | Seawater | N | Y |
| 22 | GC/PdRuOx pyrochlore + Nafion | 68 | N.A. | 0.6M NaCl | N | Y |

Although the compatibility of the Cl⁻-blocking layer and the OER-catalyzing layer is important, the anode's durability and overpotential are based on the underlying OER catalyst. As indicated in Table 1, the most durable anodes generally rely on a heavy loading of IrOx, which can lastingly endure acidic and chlorinated environments. For instance, either pure IrO₂ or a IrO₂ contents>80 at. % (>90 wt. %) is needed to ensure the longevity of the anodes. However, the tightening of global Ir production and price presents a barrier to large-scale production and use of these anodes. Therefore, there is a strong incentive to replace Ir (and PGMs in general) with elements that are cheap and abundant, while maintaining the durability in both chlorinated and acidic environments seen in PGM-based electrodes. Some PGM-free metal oxides have been studied which can potentially endure an acidic environment but exhibit poor durability in high-chlorine environments (Table 2).

TABLE 2

PGM-free, ER-selective catalysts from literature reports

| Ref | Catalysts summary | Durability | Electrolyte | Acid addition | Cl⁻ addition |
|---|---|---|---|---|---|
| 25 | MnOx | 8000 h @ 100 A/m² | pH 2 H₂SO₄ | Y | N |
| 26 | MnOx | 500 h @ 100 A/m² | 0.5M H₂SO₄ | Y | N |
| 27 | CoMnOx | 1500 h @ 2000 A/m² (pH 1 H₃PO₄) 200 h @ 1000 A/m² (pH 1 H₂SO₄) | pH 1 H₃PO₄/H₂SO₄ | Y | N |
| 28 | NiMnSbOx | 168 h @ 100 A/m² | 1.0M H₂SO₄ | Y | N |
| 29 | Co₃O₄ | 86.8 h @ 1000 A/m² | 0.5M H₂SO₄ | Y | N |
| 30 | CoFePbOx | 50 h @ 10 A/m² | pH 2 H₂SO₄ | Y | N |
| 31 | CoFeOx | 50 h @ 100 A/m² | H₂SO₄ pH 0.3 | Y | N |
| 32 | Co₃O₄ | 40 h @ 100 A/m² | 1M H₂SO₄ | Y | N |
| 33 | Fe₂O₃ | 24 h @ 100 A/m² | 0.5M H₂SO₄ | Y | N |
| 34 | NiCo-DEA | 12 h @ 100 A/m² | Seawater | N | Y |
| 35 | CoFe layered double hydroxide (LDH) | 8 h @ 100 A/m² | Sea salt pH 8 | N | Y |
| 36 | MnCoOx | 6 h @ 100 A/m² | 0.25M MgCl₂ solution | N | Y |
| 37 | MnSbOx | N.A. | 1M H₂SO₄ | Y | N |

TABLE 2-continued

PGM-free, ER-selective catalysts from literature reports

| Ref | Catalysts summary | Durability | Electrolyte | Acid addition | Cl⁻ addition |
|---|---|---|---|---|---|
| 38, 39 | MnOx | N.A. | | Y | N |
| 40 | $MnO_2$ | N.A. | 0.05M $H_2SO_4$ | Y | N |
| 41 | $Co_2TiO_4$ | N.A. | 0.5M $H_2SO_4$ | Y | N |
| 42 | $Mn_5Si_3$ | N.A. | 1.63M $H_2SO_4$ | Y | N |
| 35 | Co—Fe LDH | N.A. | Simulated seawater | N | Y |
| 43 | Co—Se | N.A. | Seawater | N | Y |

The presence of Cl⁻ in the solution is apparently detrimental and causes decomposition of PGM-free oxide catalysts and thus a substantially reduced lifetime. Adding a Cl⁻-blocking outer layer (e.g., coating) may, therefore protect PGM-free catalysts from Cl⁻ and allow for longer lifetimes and/or better performance.

Therefore, anodes with a double-layer coating could solve these OER-selectivity and stability challenges. Electrodes of the disclosure a described below in two categories: PGM-based and PGM-free electrodes.

PGM-Based Electrodes

To realize IrOx-based OER-selective anodes, literature sources report a >80% $IrO_2$ loading, which is costly and therefore challenging to commercialize. Therefore, in certain embodiments, oxygen-selective anodes of the disclosure comprise TaIr-oxides (TaIrOx doped with Ru, Sn, and Zn oxides, see Table 3)-coated electrodes comprising a Ti core (e.g., a Ti plate or Ti mesh, Table 3). A manganese oxide (MnOx) layer was applied to achieve OER selectivity, for example according to the procedure in Example 3. Three TaIrOx-coated substrates with unique compositions and low Ir-loadings were fabricated and analyzed. The results of these analyses are shown in Table 3.

Anode 1 (17.8 at % $IrO_2$ loading) coated with MnOx was tested in an exemplary flow-through electrolyzer with simulated seawater (Instant Ocean Seawater: IOSW). CIER selectivity was determined by measuring the free-chlorine concentration in anolyte effluents using a UV-vis spectrometer. At operational current densities (e.g., 300 A/m²), the CIER selectivity remains below 3% (i.e., OER>97%) under a cyclic voltage condition. No significant indication of degradation was observed over the testing period, and cell voltage remains unchanged, highlighting the stability of the TaIrSnOx layer.

Accelerated Lifetime Tests (ALT)

Accelerated lifetime tests were carried out by applying a higher current density (1000 A/m²) as compared to more typical operational current density (300 A/m²). Importantly, a well-established equation (Equation 3) can be the used to estimate service lifetime using the duration measured in ALTs:

$$\text{Predicted life} = \left(\frac{J_{ALT}}{J_{op}}\right)^{1.7} \times ALT \text{ life} \qquad (3)$$

where $J_{ALT}$ is the current density used in accelerated lifetime tests (e.g., 1000 A/m²), $J_{op}$ is the operation current density (e.g., 300 A/m²), and the exponent of 1.7 is an empirical constant. Therefore, Equation 4 yields:

TABLE 3

Summary of selected anodes with MMO (TaIrOx doped with Ru, Sn, and Zn oxides, see Table 3) described herein.

| Anode Substrate No. | 1 | | 2 | | 3 | |
|---|---|---|---|---|---|---|
| Substrate | Ti plate | | Ti plate | | Expanded Ti mesh | |
| Coating thickness | >5 um | | >5 um | | >5 um | |
| Ir loading | 22 g/m² | | 5 g/m² | | 15 g/m² | |
| Estimated lifetime | 5 years @ <1000 A/m² | | 5 years @ <1000 A/m² | | 5 years @ <1000 A/m² | |
| Composition (EDS) | atomic % (at %) | at % error | at % | at % error | at % | at % error |
| O | 64.82 | 0.33 | 68.20 | 0.21 | 72.67 | 0.58 |
| Ti | 3.91 | 0.09 | 5.15 | 0.07 | 1.24 | 0.16 |
| Ru | — | — | — | — | 1.28 | 0.07 |
| Sn | 7.29 | 0.15 | — | — | — | — |
| Zn | — | — | 4.01 | 0.03 | — | — |
| Ta | 15.46 | 0.10 | 12.15 | 0.05 | 7.77 | 0.20 |
| Ir | 5.77 | 0.08 | 7.03 | 0.04 | 17.05 | 0.68 |
| Total | 97.25 | 0.75 | 96.54 | 0.40 | 100.00 | 1.68 |
| Coating $IrO_2$ content | 17.8 at % | | 24.8 at % | | 62.4 at % | |

$$\text{Predicted life} = 7.74 \times ALT \text{ life} \qquad (4)$$

Figure 22A:
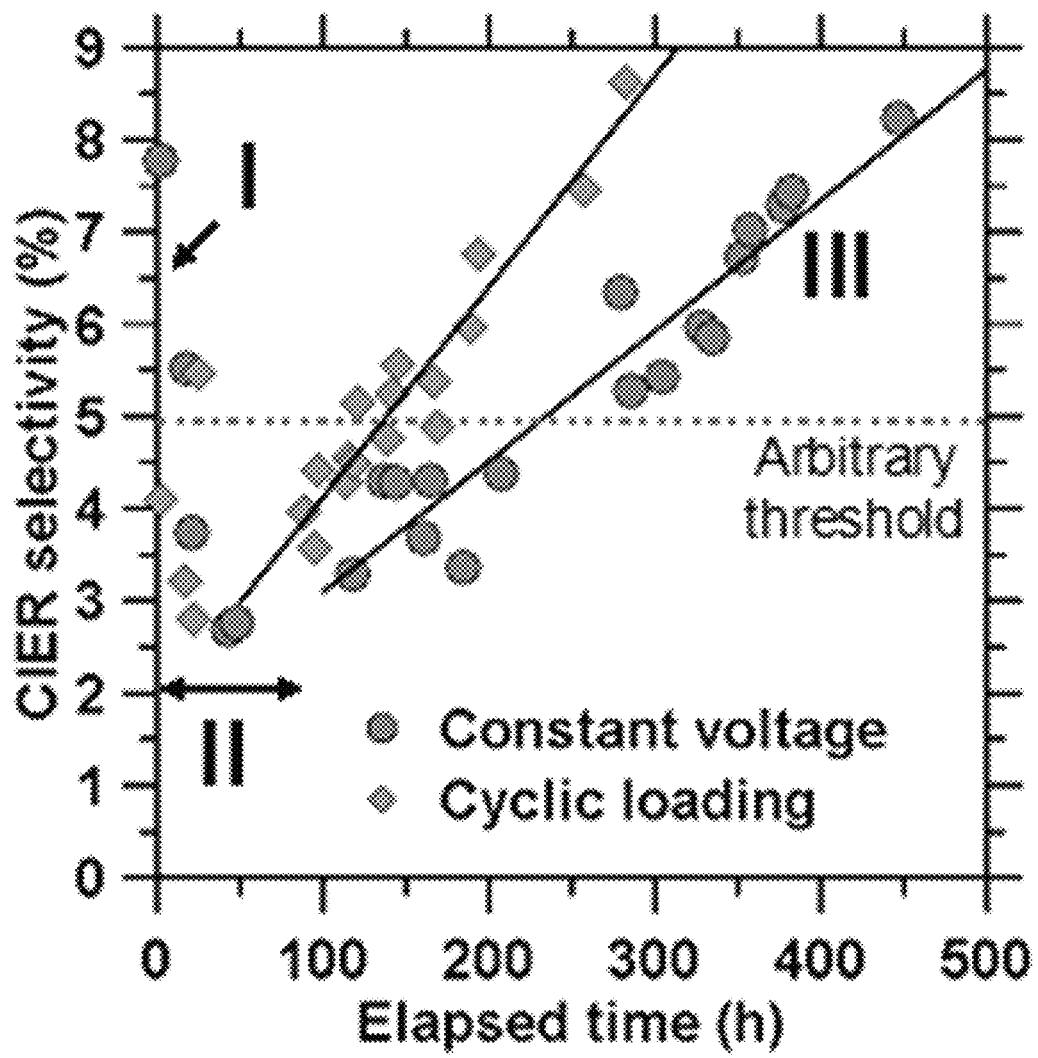
FIG. 22A shows Accelerated Lifetime Testing (ALT) performance of exemplary anodes based on anode substrate 2 under constant and cyclic voltage conditions. Three distinguished stages were revealed by the ALT tests, including stabilization (stage I), stabilized (stage II), and linear degradation (Stage III).
Figure 22B:
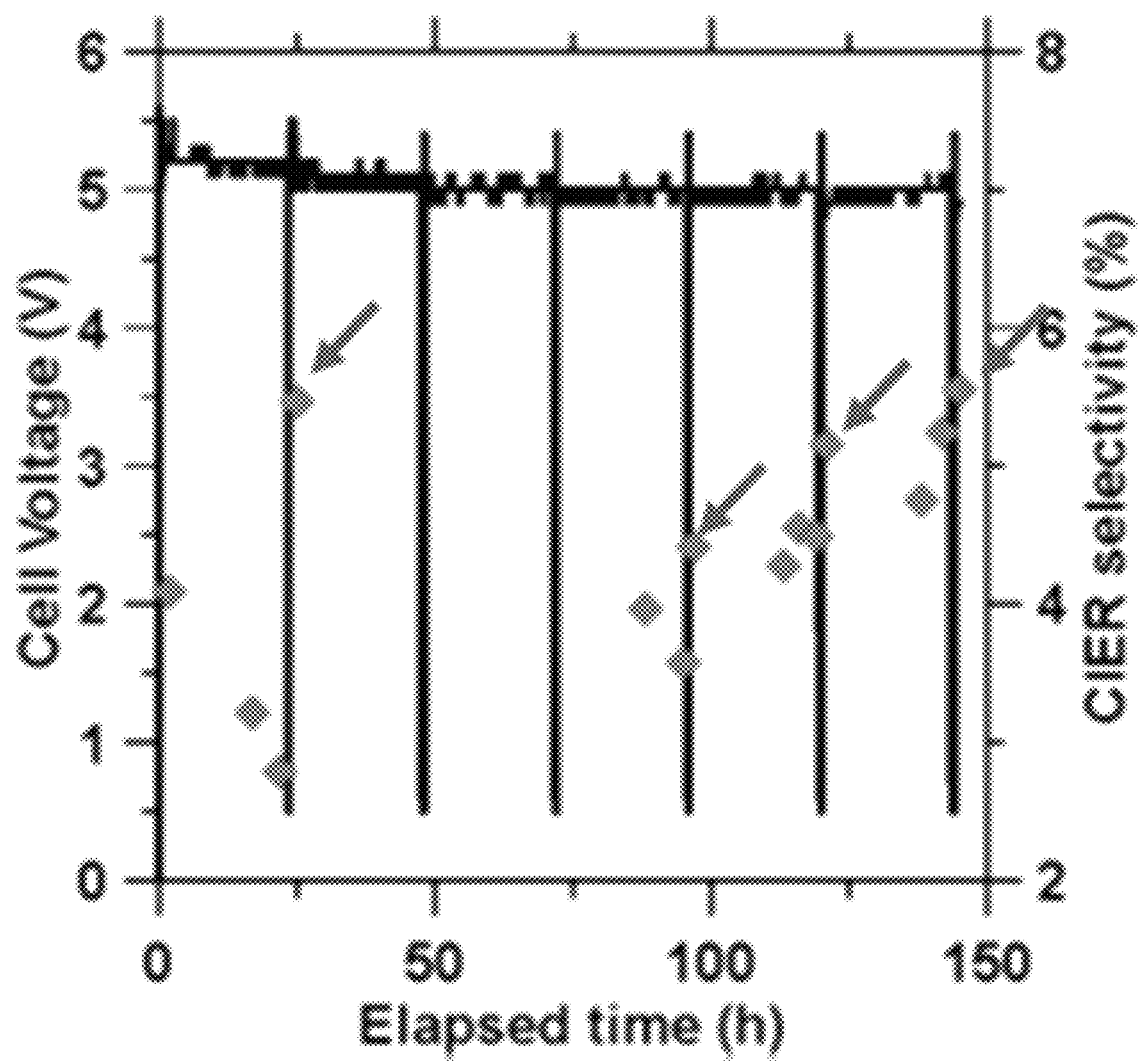
FIG. 22B shows CIER selectivity changes under the cyclic voltage loading over the course of 150 h.
Figure 22D:
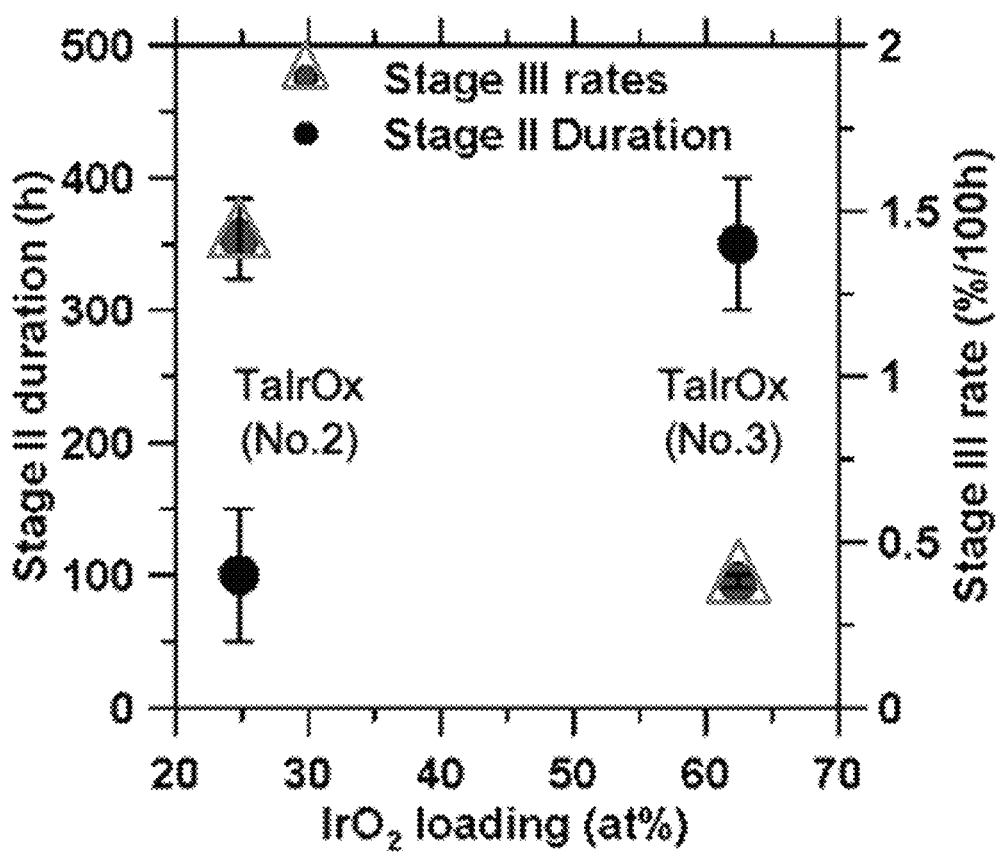
FIG. 22D demonstrates that, as observed in CIER evolution, longer stage II duration correlated with slower degradation rates observed in stage III. The ALT experiments were conducted in a flow-through electrolyzer with 0.5M NaCl as electrolyte.

Using ALT, the impacts of cyclic or constant voltage loading conditions on the predicted lifetime were examined (FIG. 22A). Interestingly, there are typically three stages observed in ALTs. The CIER selectivity drops at the initial 24-48 hours (stage I), this is usually accompanied by the cell potential reduction (FIG. 22B) likely due to hydrolysis and stabilization of MnOx in the ionic ($H^+$, $Na^+$) environment. The low CIER selectivity is maintained for a short period (stage II), and then increases at a constant rate (stage III). As observed, stage I is generally similar for all experiments whereas stage II-III characterizes the electrode durability and depends on the specific composition of the electrode. For instance, when the anode is subjected to cyclic voltage loading, the duration of stage II was shorter and the degradation rate in stage III was faster. Notably, cyclic loading induces a significant reduction in lifetime (~40%), and the selectivity failure was preceded by the progressive upsurge of CIER selectivity after every voltage cycle (see FIG. 22B), which appeared to have disrupted the stabilization of MnOx. When the current is turned on and off, the anode surface was switched between $H^+$-rich to $Na^+$-rich ionic environments, leading to a structural change of MnOx between hydrogenated and Na-enriched forms. Consequently, structural damage is likely to occur in the MnOx layer resulting in a shortened life. Failure analysis at the end of each experiment revealed the degraded MnOx layer as the origin of lost CIER selectivity.

Furthermore, substrate dissolution may also cause MnOx detachment and OER selectivity loss. Although it is slow, the dissolution of only a few atomic layers of the TaIrOx can induce debonding between the two layers. In addition, cyclic loading also promotes reconstruction of the substrate's crystalline structure, leading to accelerated debonding between TaIrOx and MnOx layers. Therefore, substrate renewal becomes more important to mitigate the debonding issues and to prolong the OER-selective lifetime.

Figure 2:
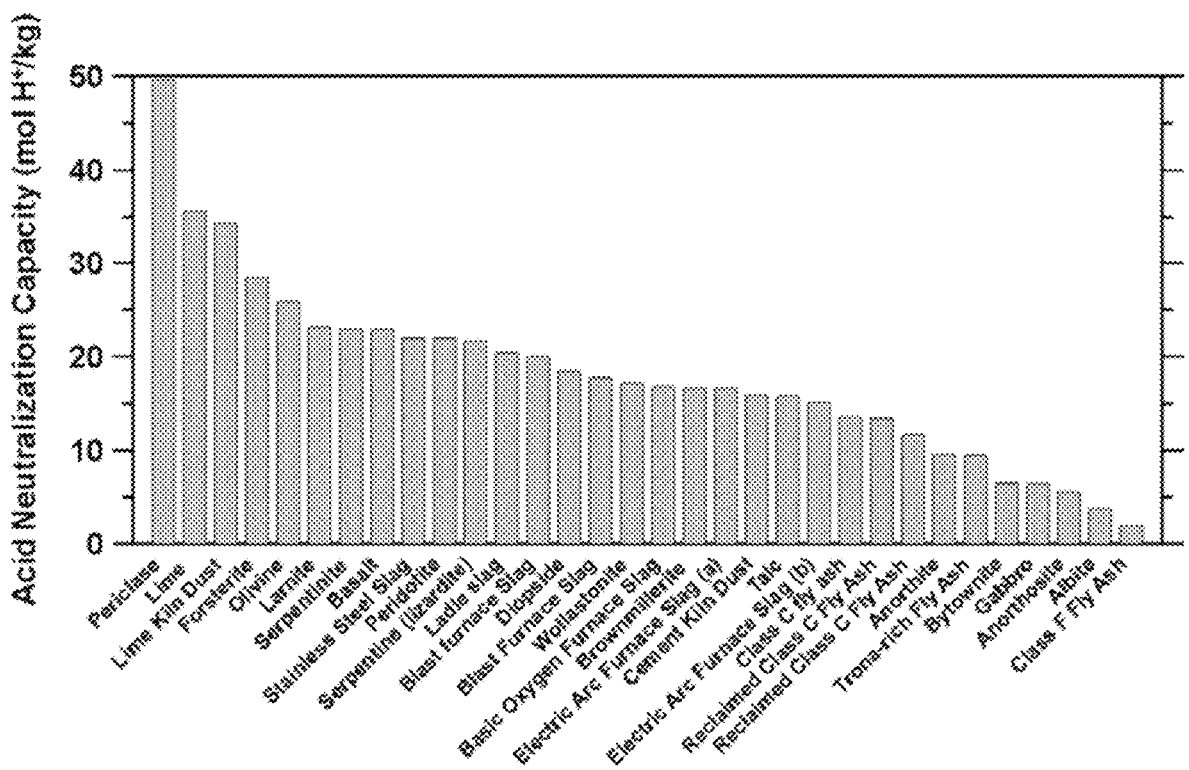
FIG. 2 shows the acid neutralization capacity (mol $H^+$/kg solute) of various exemplary deacidifying agents of the disclosure, established on the basis of their chemical composition. In general, a smaller quantity (mass) of solute is used as acid neutralization capacity increases.

A second set of ALTs aims to evaluate the impacts of the substrate's $IrO_2$ loading. Testing was performed for the TaIrOx substrate from anode 2 (24.8 at % $IrO_2$) and anode 3 (62.4 at % $IrO_2$) under the constant voltage condition. As indicated in FIGS. 22C and 2D, a higher $IrO_2$ content in anode 3 not only prolongs the duration of stage II but also reduced the degradation rate observed in stage III.

In certain embodiments, the MMO layer comprises Ta, Ir, and O. In certain embodiments, the first metal oxide comprises Ta, and the second metal oxide comprises Ir. In some embodiments, the MMO layer comprises Sn, Ir, and O. In certain embodiments, the first metal oxide comprises Sn, and the second metal oxide comprises Ir. In some embodiments, the MMO layer comprises Co, Mn, and O. In certain embodiments, the first metal oxide is Co, and the second metal oxide is Mn. In certain embodiments, the MMO layer further comprises a dopant selected from Ta, Co, and Nb, or a combination thereof.

In certain embodiments, the MMO layer comprises from about 5 atomic % (at. %) Ir to about 65 at. % Ir. In further embodiments, the MMO layer comprises from about 15 at. % Ir to about 30 at. % Ir. In certain preferred embodiments, the MMO layer comprises about 5.77 at. % Ir. In other preferred embodiments, the MMO layer comprises about 7.03 at. % Ir. In some embodiments, the MMO layer comprises from about 17 at. % Ir to about 65 at. % Ir. In certain preferred embodiments, the MMO layer comprises about 62.4 at. % Ir.

In some embodiments, the outer layer further comprises an outer layer dopant. In certain embodiments, the outer layer further comprises two or more outer layer dopants. In certain preferred embodiments, each of the outer layer dopants is a transition metal. In some preferred embodiments, the outer layer dopant is selected from a transition metal oxide, a transition metal hydroxide, and transition metal oxyhydroxide.

In certain embodiments, the outer layer is coated on the surface of the MMO layer.

In some embodiments, the outer layer is coated in-mix (e.g., intermingled) with the MMO layer.

In certain embodiments, the MMO layer comprises one or more additional MMO layers. In some embodiments, the MMO layer comprises 1 additional MMO layer. In certain embodiments, the MMO layer comprises 2 additional MMO layers. In some embodiments, the MMO layer comprises 3 additional MMO layers. In certain embodiments, the MMO layer comprises 4 additional MMO layers. In some embodiments, the MMO layer comprises 5 additional MMO layers. In certain embodiments, the additional MMO layer(s) comprises an element selected from groups 3, 4, 5, 6, 7, 8, 9, 10, 11, 12, 13, and 14. In further embodiments, the additional MMO layer(s) comprises a metal oxide comprising Ta, Ru, Ti, Y, Sr, Sn, La, Ce or Ir. In certain preferred embodiments, the additional MMO layer(s) has a composition as defined in the present disclosure.

In certain embodiments, the substrate is contacted with the MMO layer at a substrate-MMO junction, and the MMO layer is contacted with the outer layer at a MMO-outer layer junction. In some embodiments, the substrate-MMO junction is substantially flat. In other embodiments, the substrate-MMO junction is substantially rough. In some embodiments, the substrate-MMO junction is a bulk heterojunction. In certain embodiments, the MMO-outer layer junction is substantially flat. In other embodiments, the MMO-outer layer junction is substantially rough. In certain embodiments, the MMO-outer layer junction is a bulk heterojunction.

Figure 14:
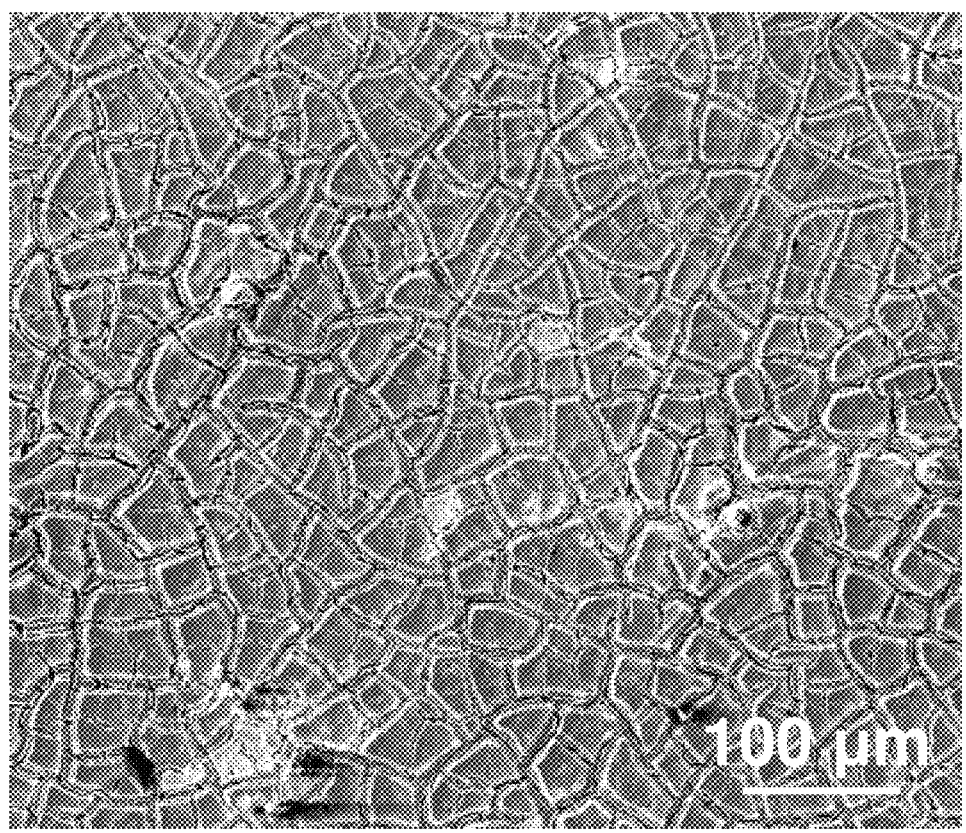
FIG. 14 shows exemplary surface morphology of the surface of an Ir—Sn MMO layer.
Figure 15:
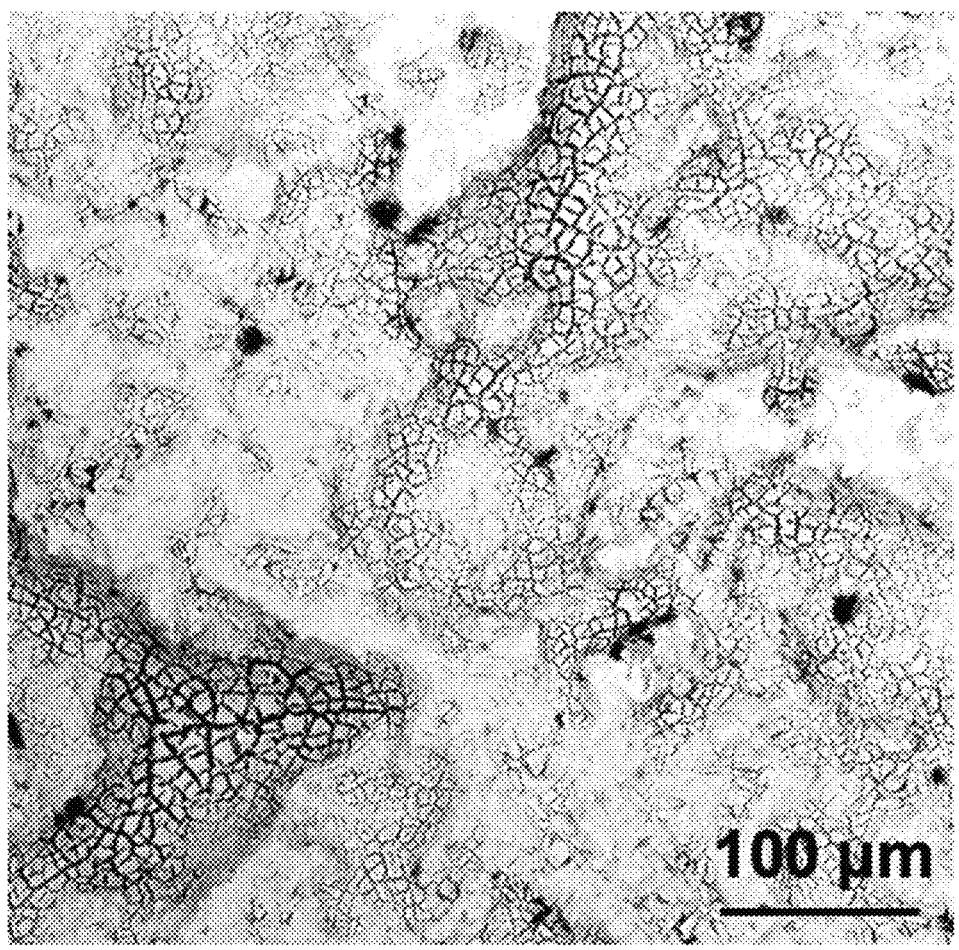
FIG. 15 shows exemplary surface morphology of the surface of an Ir—Ta MMO layer.
Figure 16:
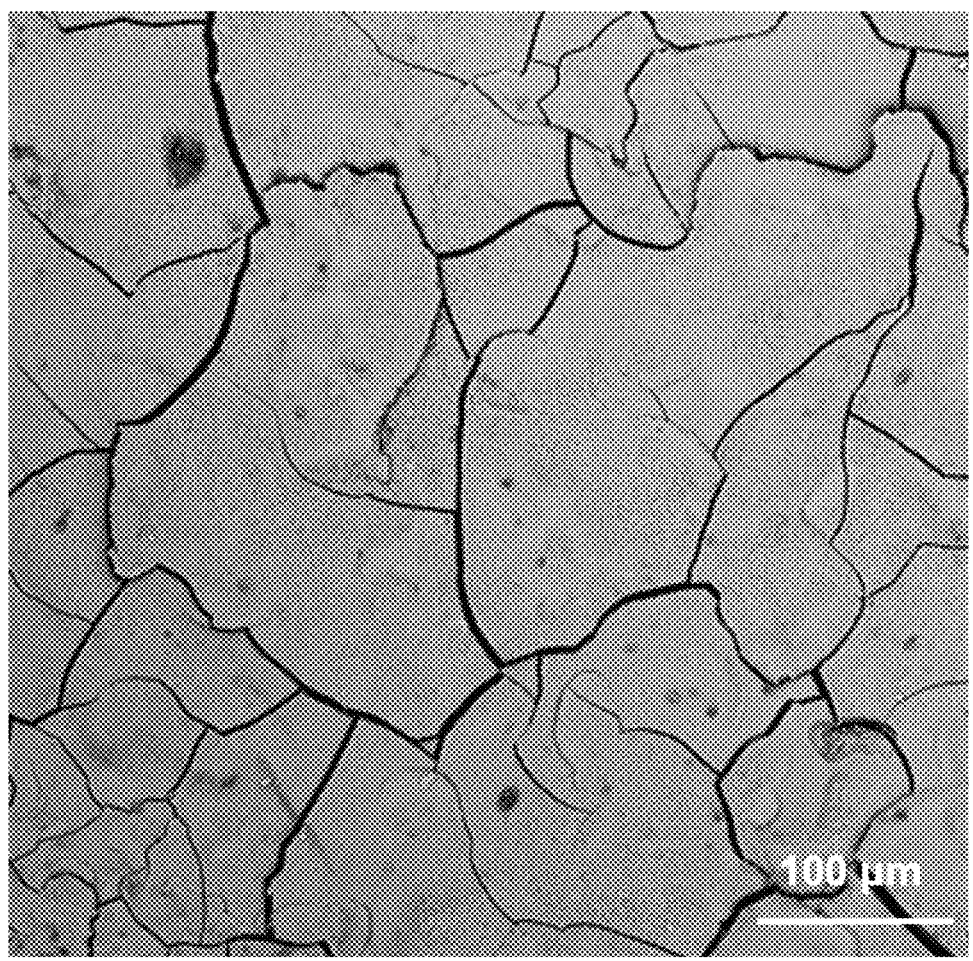
FIG. 16 shows exemplary surface morphology of the surface of a Mn oxide outer layer.
Figure 17:
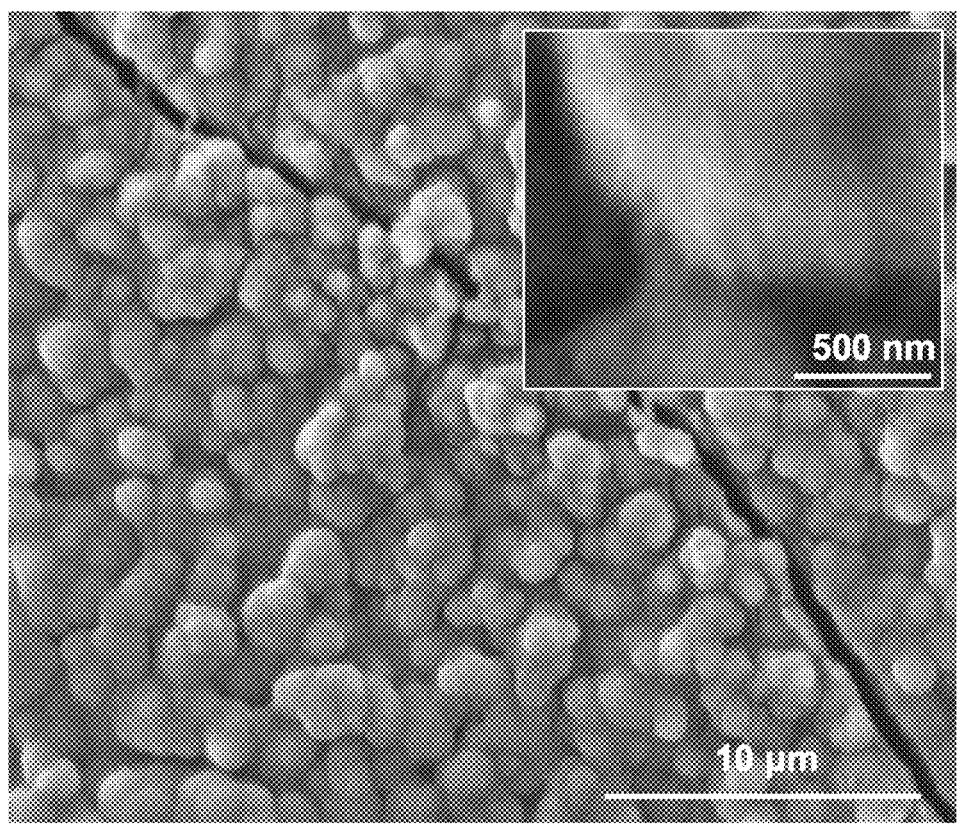
FIG. 17 shows exemplary surface morphology at high magnifications of the Mn oxide outer layer.

In certain preferred embodiments, the outer layer has a surface morphology comprising spheres. In further preferred embodiments, the spheres have a diameter in the nanometer range. In other preferred embodiments, the spheres have a diameter in the micrometer range. In certain embodiments, the spheres have a diameter from 0.01 μm to 10 μm. In certain embodiments, the spheres have a composition as defined in the present disclosure (e.g., the spheres comprise a mixed metal oxide as specified herein). In certain embodiments, the spheres comprise ramsdellite ($\gamma$-$MnO_2$). In some embodiments, the MMO layer has a surface morphology substantially as depicted in FIG. 14. In certain embodiments, the MMO layer has a surface morphology substantially as depicted in FIG. 15. In some embodiments, the outer layer has a surface morphology substantially as depicted in FIG. 16. In certain embodiments, the spheres have a morphology as depicted in FIG. 17. In some embodiments, the spheres have a morphology as depicted in FIG. 17. In certain preferred embodiments, the surface morphology of the outer layer increases the surface area of the outer layer by 1× to 100×.

In certain embodiments, the oxygen-selective anode further comprises a binding layer disposed between the MMO layer and the outer layer. In some embodiments, the binding layer comprises a copolymer comprising at least one unit of the first monomer and at least one unit of a second monomer, wherein the first monomer is tetrafluoroethylene, and the second monomer is sulfonated perfluorovinyl ether. In certain embodiments, the binding layer comprises a sulfonated tetrafluoroethylene copolymer. In some embodiments, the binding layer comprises a compound having a CAS registry number 66796-30-3.

In certain embodiments, the MMO layer comprises Ta, Ir, and O, and the oxygen-selective anode has a lifetime of from about 1000 h to about 8000 h measured at an operating current density of about 300 A/m$^2$. In some embodiments, the MMO layer comprises Ta, Ir, and O, and the oxygen-selective anode has a lifetime of about 7353 h.

In certain embodiments, the oxygen-selective anode has a selectivity for OER of greater than about 97%. In some embodiments, the oxygen-selective anode has a selectivity for OER from about 97% to about 99%. In preferred embodiments, the oxygen-selective anode has a selectivity for OER of greater than about 99%.

In certain embodiments, the outer layer has a surface having a mean area roughness (Sa) of from about 1 μm to about 10 μm. In further embodiments, the outer layer preferably has a surface having a mean area roughness (Sa) of about 1.27 μm, about 2 μm, about 4 μm, or about 10 μm.

In certain embodiments, the outer layer has a surface that is substantially flat (e.g., homogeneous). In further embodiments, the outer layer has a surface having a mean area roughness (Sa) of from 0 μm to about 1 μm. In further embodiments, the outer layer has a surface having a mean area roughness (Sa) of about 0.1 μm, about 0.2 μm, about 0.5 μm, or about 1 μm.

In certain embodiments, the substrate is solid (e.g., non-porous). In other embodiments, the substrate is porous. In some embodiments, the substrate is a plate, mesh, felt, foam, fiber, and particle, or a combination thereof. In some embodiments, the substrate is a plate. In certain embodiments, the substrate is a mesh. In some embodiments, the substrate is a felt. In some embodiments, the substrate is a foam. In some embodiments, the substrate is a fiber. In some embodiments, the substrate is a particle. In some embodiments, the substrate is a combination of a plate, mesh, felt, foam, fiber, or particle.

PGM-Free Anodes

In spite of the long lifetimes of PGM-based electrodes, PGM metals have a low abundance in the earth's crust, and Ir is the rarest of the PGMs. Therefore, PGM-free anodes are desirable to complement the PGM-based electrodes.

Figure 24A:
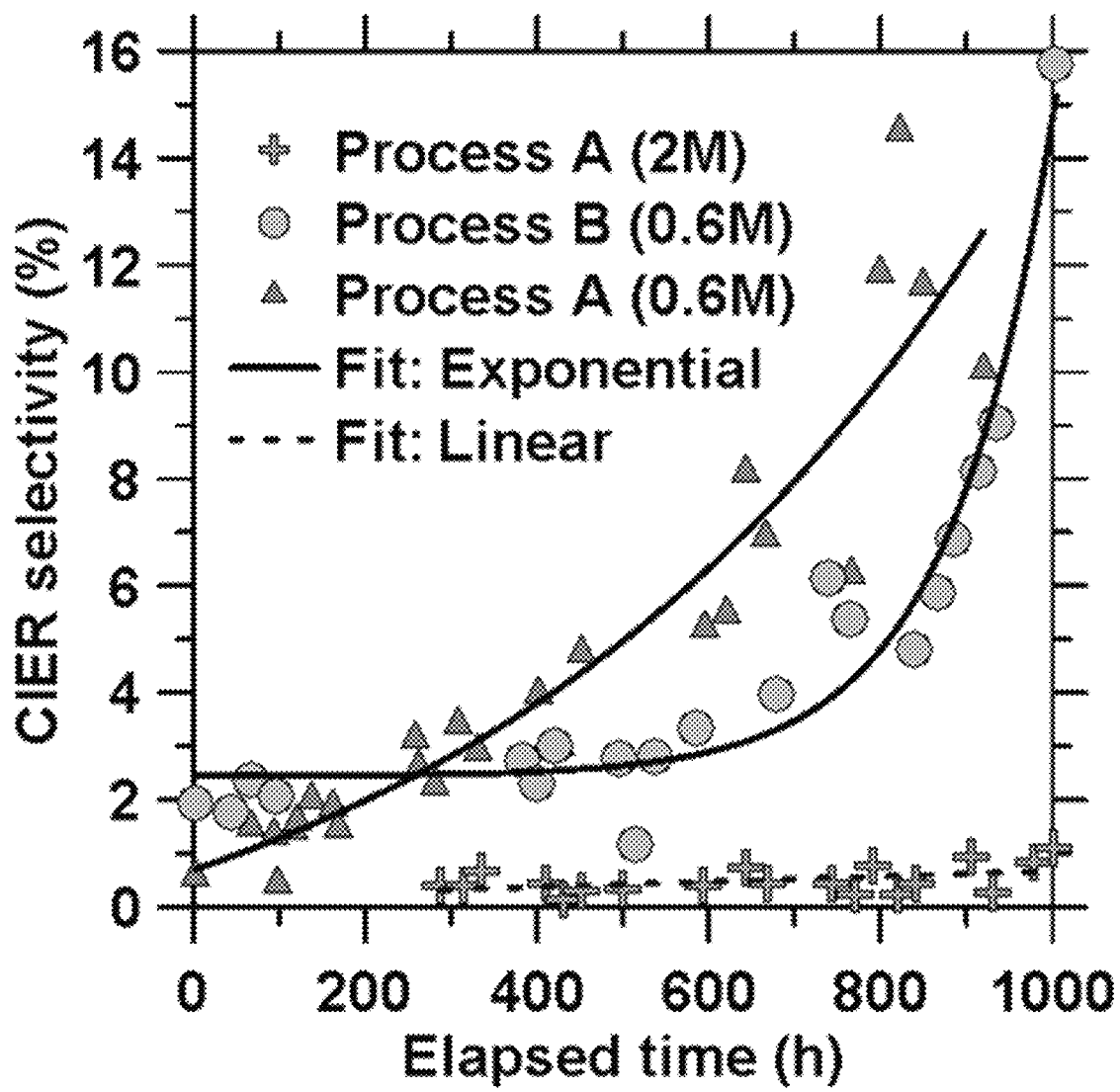
FIGS. 24A and 24B show the ClER selectivity (24A) and cell voltage (24B) obtained from ALT durability experiments of PGM-free electrodes electroplated at various $H_2SO_4$ concentrations and various processes.

As indicated by Table 2, Co- and Mn-based catalysts have been identified as components of durable catalysts that can be used in acidic environments. Therefore, the PGM-free anodes described herein also adopt the double-layer structure used with success in the PGM-based electrodes described above, but with the TaIrOx-based OER-catalyst layer replaced by, e.g., a CoMnOx catalyst. As depicted in FIG. 24A, two processes have been trialed to fabricate PGM-free anodes, with the primary difference being whether to add Nafion as a binder of the CoMnOx catalyst and Cl$^-$-blocking layer. In addition, two distinct MnOx morphologies were tested, which were imparted by varying the H$_2$SO$_4$ concentration used in the electroplating process, as discussed above and in Example 5 (see also FIG. 23A).

Preliminary durability tests for PGM-free anodes were carried out under a lower current density of 150 A/m$^2$. This is because CoMnOx and the most similar transition metal (e.g., Ni, Fe) oxides undergo redox reactions at the more anodic potentials, leading to the decomposition of the catalysts. For instance, solid MnO$_2$ can be oxidized to soluble permanganate ions (MnO$_4^-$) at high potentials. Even in Cl$^-$-free environments, PGM-free catalysts are usually operated at low current densities (≤100 A/m$^2$)—an order of magnitude lower than that of PGM-catalysts (>1000 A/m$^2$, see Table 1-2).

Figure 24B:
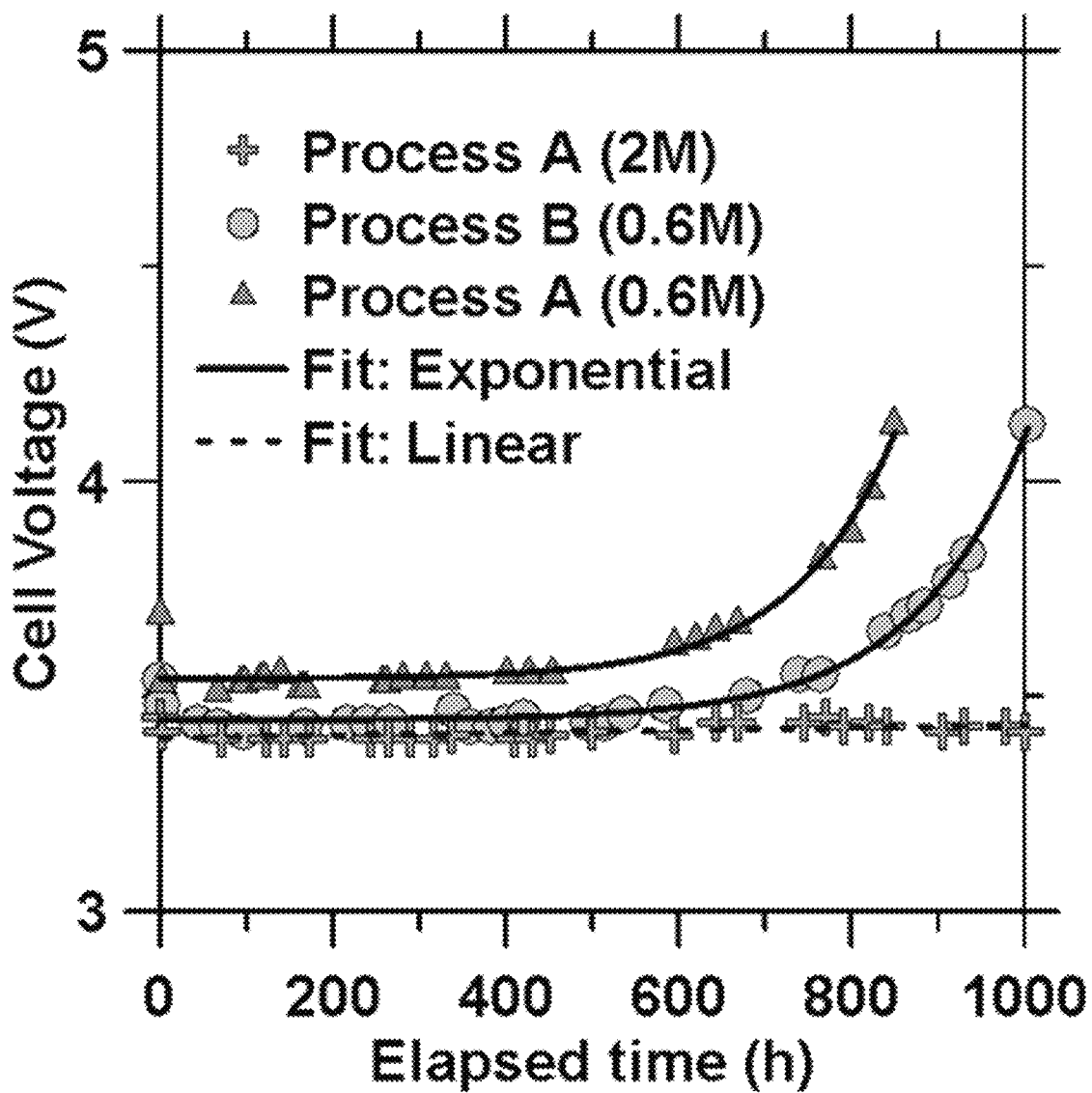

The degradation behavior of PGM-free anodes differs from the PGM-based anodes. For the case of anodes made by Process A, having a lower H$_2$SO$_4$ concentration during electroplating, the CIER selectivity evolution exhibited an initial steady-state but increased exponentially (FIG. 24A) thereafter. A similar trend was observed in cell voltage evolutions (FIG. 24A), wherein the sudden increase in cell voltage indicates the deactivation of the CoMnOx catalyst. Notably, the cell voltage was stable up to 600 hours while the CIER selectivity increased very early on, implying the CoMnOx deactivation is likely caused by Cl$^-$ and free chlorine species induced by a damaged MnOx layer. Therefore, it is important to improve the MnOx layer's integrity so it can better protect the underlying CoMnOx. Preliminary results indicate that modifying the concentration of the acid in the electroplating precursor resulted in a MnOx layer that is much more compatible with CoMnOx, yielding a significantly lower CIER selectivity (<1%, see FIG. 24A and FIG. 24B, sample Process A). The cell voltage of the same sample has been measured for more than 800 hours without signs of CoMnOx deactivation. In addition, adding Nafion as the binder (Process B) slightly improves the stability, but the CIER selectivity was on the same order as Process A, and the upsurge in CIER selectivity at >600 hours also led to the cell potential increase as shown in FIG. 24B.

In certain embodiments, the MMO layer comprises Co, Mo, Sn, and O. In some embodiments, the first metal oxide comprises Co, the second metal oxide comprises Mo, and the third metal oxide comprises Sn.

In some embodiments, the outer layer further comprises an outer layer dopant. In certain embodiments, the outer layer further comprises two or more outer layer dopants. In certain preferred embodiments, each of the outer layer dopants is a transition metal. In some preferred embodiments, the outer layer dopant is selected from a transition metal oxide, a transition metal hydroxide, and transition metal oxyhydroxide.

In certain embodiments, the outer layer is coated on the surface of the MMO layer.

In some embodiments, the outer layer is coated in-mix (e.g., intermingled) with the MMO layer.

In certain embodiments, the MMO layer comprises one or more additional MMO layers. In some embodiments, the MMO layer comprises 1 additional MMO layer. In certain embodiments, the MMO layer comprises 2 additional MMO layers. In some embodiments, the MMO layer comprises 3 additional MMO layers. In certain embodiments, the MMO layer comprises 4 additional MMO layers. In some embodiments, the MMO layer comprises 5 additional MMO layers. In certain embodiments, the additional MMO layer(s) comprises an element selected from groups 3, 4, 5, 6, 7, 8, 9, 10, 11, 12, 13, and 14. In further embodiments, the additional MMO layer(s) comprises a metal oxide comprising Ta, Ru, Ti, Y, Sr, Sn, La, Ce or Ir. In certain preferred embodiments, the additional MMO layer(s) has a composition as defined in the present disclosure.

In certain embodiments, the substrate is contacted with the MMO layer at a substrate-MMO junction, and the MMO layer is contacted with the outer layer at a MMO-outer layer junction. In some embodiments, the substrate-MMO junction is substantially flat. In other embodiments, the substrate-MMO junction is substantially rough. In some embodiments, the substrate-MMO junction is a bulk heterojunction. In certain embodiments, the MMO-outer layer junction is substantially flat. In other embodiments, the MMO-outer layer junction is substantially rough. In certain embodiments, the MMO-outer layer junction is a bulk heterojunction.

In certain preferred embodiments, the outer layer has a surface morphology comprising spheres. In further preferred embodiments, the spheres have a diameter in the nanometer range. In other preferred embodiments, the spheres have a diameter in the micrometer range. In certain embodiments, the spheres have a diameter from 0.01 μm to 10 μm. In certain embodiments, the spheres have a composition as defined in the present disclosure (e.g., the spheres comprise a mixed metal oxide as specified herein). In certain embodiments, the spheres comprise ramsdellite (γ-MnO$_2$). In some embodiments, the MMO layer has a surface morphology substantially as depicted in FIG. 14. In certain embodiments, the MMO layer has a surface morphology substantially as depicted in FIG. 15. In some embodiments, the outer layer has a surface morphology substantially as depicted in FIG. 16. In certain embodiments, the spheres have a morphology as depicted in FIG. 17. In some embodiments, the spheres have a morphology as depicted in FIG. 17. In certain preferred embodiments, the surface morphology of the outer layer increases the surface area of the outer layer by 1× to 100×.

In certain embodiments, the oxygen-selective anode further comprises a binding layer disposed between the MMO layer and the outer layer. In some embodiments, the binding layer comprises a copolymer comprising at least one unit of the first monomer and at least one unit of a second monomer, wherein the first monomer is tetrafluoroethylene, and the second monomer is sulfonated perfluorovinyl ether. In certain embodiments, the binding layer comprises a sulfonated tetrafluoroethylene copolymer. In some embodiments, the binding layer comprises a compound having a CAS registry number 66796-30-3.

In certain embodiments, the MMO layer comprises Co, Mn, and O, and the oxygen selective anode has a lifetime of from about 300 h to over 1000 h measured at a current density of about 150 A/m$^2$. In some embodiments, the MMO layer comprises Co, Mn, and O, and the oxygen selective anode has a lifetime of about 500 h measured at an operating current density of about 300 A/m$^2$.

In certain embodiments, the oxygen-selective anode has a selectivity for OER of greater than about 97%. In some embodiments, the oxygen-selective anode has a selectivity for OER from about 97 to about 99%. In preferred embodiments, the oxygen-selective anode has a selectivity for OER of greater than about 99%.

In certain embodiments, the outer layer has a surface having a mean area roughness (Sa) of from about 1 μm to about 10 μm. In further embodiments, the outer layer preferably has a surface having a mean area roughness (Sa) of about 1.27 μm, about 2 μm, about 4 μm, or about 10 μm.

In certain embodiments, the outer layer has a surface that is substantially flat (e.g., homogeneous). In further embodiments, the outer layer has a surface having a mean area roughness (Sa) of from about 0 μm to about 1 μm. In further embodiments, the outer layer has a surface having a mean area roughness (Sa) of about 0.1 μm, about 0.2 μm, about 0.5 μm, or about 1 μm.

In certain embodiments, the substrate is solid (e.g., non-porous). In other embodiments, the substrate is porous. In some embodiments, the substrate is a plate, mesh, felt, foam, fiber, and particle, or a combination thereof. In some embodiments, the substrate is a plate. In certain embodiments, the substrate is a mesh. In some embodiments, the substrate is a felt. In some embodiments, the substrate is a foam. In some embodiments, the substrate is a fiber. In some embodiments, the substrate is a particle. In some embodiments, the substrate is a combination of a plate, mesh, felt, foam, fiber, or particle.

CO$_2$ Mineralization and Removal Using Alkaline Solutions

Saline water (e.g., seawater) alkalization can be induced at overpotentials (e.g., ≤0.5 V) that yields locally-produced alkalinity (e.g., OH$^-$ ions) at the cathode as a result of the hydrogen evolution reaction (HER):

$$2H_2O_{(l)} + 2e^- \rightarrow H_{2(g)} + 2OH^-_{(aq)} \quad (5)$$

The reaction not only produces hydrogen that can be collected as a clean fuel, it also produces alkalinity that can then react with atmospheric or concentrated CO$_2$ (e.g., 400 ppm to 100%):

$$CO_2 + OH^- \rightarrow HCO_3^- \quad (6)$$

$$CO_2 + 2OH^- \rightarrow CO_3^{2-} + H_2O \quad (7)$$

Alternatively, with the presence of multi-valent cations (e.g., Ca$^{2+}$, Mg$^{2+}$), the alkalinity (OH ions) combined with CO$_2$ overcomes the barriers to Ca- and Mg-based mineral precipitation. The net reaction for calcium and magnesium ions are:

$$Ca^{2+} + CO_2 + 2OH^- \rightarrow CaCO_3 + H_2O \quad (8)$$

$$Mg^{2+} + CO_2 + 2OH^- \rightarrow MgCO_3 + H_2O \quad (9)$$

In many cases, CO$_2$ is trapped in the solid carbonate and/or hydroxycarbonate forms. On the other hand, the precipitation of calcium and magnesium carbonate could be kinetically limited at low DIC concentrations (e.g., <10 mM), thus, alkalinity can also force the precipitation hydroxides according to the following reactions:

$$Ca^{2+} + 2OH^- \rightarrow Ca(OH)_2 + H_2O \quad (10)$$

$$Mg^{2+} + 2OH^- \rightarrow Mg(OH)_2 + H_2O \quad (11)$$

whose dissolution in water (e.g., seawater), can also result in atmospheric or concentrated CO$_2$ (400 ppm to 100%) drawdown as HCO$_3^-$/CO$_3^{2-}$ ions (as indicated in Reactions 6-7). Strategies and conditions (e.g., direct hydroxide carbonation) for the formation of calcium and magnesium carbonates and hydroxycarbonates, e.g., calcite (CaCO$_3$), aragonite (CaCO$_3$), nesquehonite (MgCO$_3$·3H$_2$O), and hydromagnesite (Mg$_5$(CO$_3$)$_4$(OH)$_2$·4H$_2$O) can also be exploited, thereby resulting in solid CO$_2$ mineralization. In other embodiments, carbon are trapped in the dissolved (i.e., HCO$_3^-$/CO$_3^{2-}$ ions) form, whereby less alkalinity (OH$^-$) are needed for every mole of CO$_2$ mineralized. These conditions can be achieved by equilibrating the alkalinized saline water with air (i.e., 400 ppm CO$_2$) or concentrated CO$_2$ streams (400 ppm to 100%), yielding two limiting cases: (1) solid carbonate/hydroxycarbonates production (i.e., 100% solid CO$_2$ sequestration), and (2) aqueous CO$_2$ sequestration. Following the former, 1 mol of CO$_2$ is captured by 2 mol of hydroxyl ions (OH⁻) to produce 1 mol $CaCO_3$, $MgCO_3$ or other alkali metal (e.g., Na, K, etc.) carbonates. In case of the latter, every mol of hydroxide ions (OH—) leads to the absorption of 1-2 mol of $CO_2$ to form aqueous $HCO_3^-/CO_3^{2-}$ ions. The $CO_2$ immobilization can be implemented by using carbonation reactors, or by deploying the alkaline products (solids and solutions) on land and/or ocean allowing for atmospheric $CO_2$ drawdown. In any case, products from $CO_2$ immobilization should fall within the two limiting cases and yield a combination of solid and aqueous carbonate species.

Treatment of Anodic Products

On the other hand, acid will be produced at the anode from oxygen evolution reactions (OER):

$$H_2O \rightarrow \frac{1}{2}O_2 + 2H^+ + 2e^- \quad (12)$$

For (NaCl-containing) saline water electrolysis, chlorine evolution reactions (ClER):

$$2Cl^- - 2e^- \rightarrow Cl_2 \quad (13)$$

competes with the OER at the anode: OER is thermodynamically more favorable (i.e., OER initiates at lower potentials) but ClER is kinetically faster as fewer electron transfers are involved. At large scales, $Cl_2$ evolution and the formation of free-chlorine species (e.g., $Cl_2$, ClO⁻, or HClO, etc.) are in general harmful and should be suppressed.

In certain embodiments, a manganese oxide-based (MnOx-) anode is used to inhibit chlorine evolution, achieving less than 25% ClER efficiency and at least 75% OER efficiency. In general, the manganese oxide-based anodes of the disclosure may be doped or functionalized with other transition metals (e.g., Ir, Ta, Ru, Pd, Sn, Pb, Mn, Co, Fe, Mo, Sn, W, Cr, Ni, or Ti), which may be present as oxides, hydroxides, oxyhydroxides, or any combinations thereof, for enhanced selectivity and durability. In addition, the manganese oxides based (MnOx-) catalysts can be directly coated (e.g., via electroplating, electrodeposition, sol-gel coating, chemical/physical deposition, sintering, etc.) on conductive or semi-conductive substrates (e.g., metals, metal oxides, metal silicates, metal carbonates, metal phosphides, metal sulfides, metal selenides, graphite, graphene, carbon nanotubes, glassy carbon, or any combination thereof). In other embodiments, the MnOx-catalysts are coated in-mix or on-top of other catalysts, e.g., transition metals, such as Ir, Ta, Ru, Pd, Sn, Pb, Mn, Co, Fe, Mo, Sn, W, Cr, Ni, or Ti etc., oxides, hydroxides, oxyhydroxides or any combinations thereof, to promote anode stability and conductivity.

In certain embodiments, as a consequence of the use of OER-selective anodes, molar equivalents of acid are produced in proportion to the amount of chlorine avoided. Accordingly, the use of a thicker porous separator between the anodic and cathodic cells performing seawater electrolysis may be necessary, as compared to a system that is evolving chlorine. In certain embodiments, the porous separator is an acid resistant, hydrophilic ceramic (e.g., aluminum oxide, zirconium oxide, silicon dioxide, asbestos, hydrous aluminum phyllosilicates, clay, or any combination thereof), polymer (e.g., cellulose, polyvinyl chloride, organic rubber, polyolefin, polyethylene, polypropylene, polyvinylidene fluoride, polytetrafluoroethylene, epoxy resin, silicone, or any combination thereof), or ceramic-polymer composite separator. The separator materials can be used as is, or be treated to enhance surface hydrophilicity. The median pore size can of the separators can range from 10 nm to 500 μm, and the thickness can range from 100 μm to 5 mm.

Figure 3:
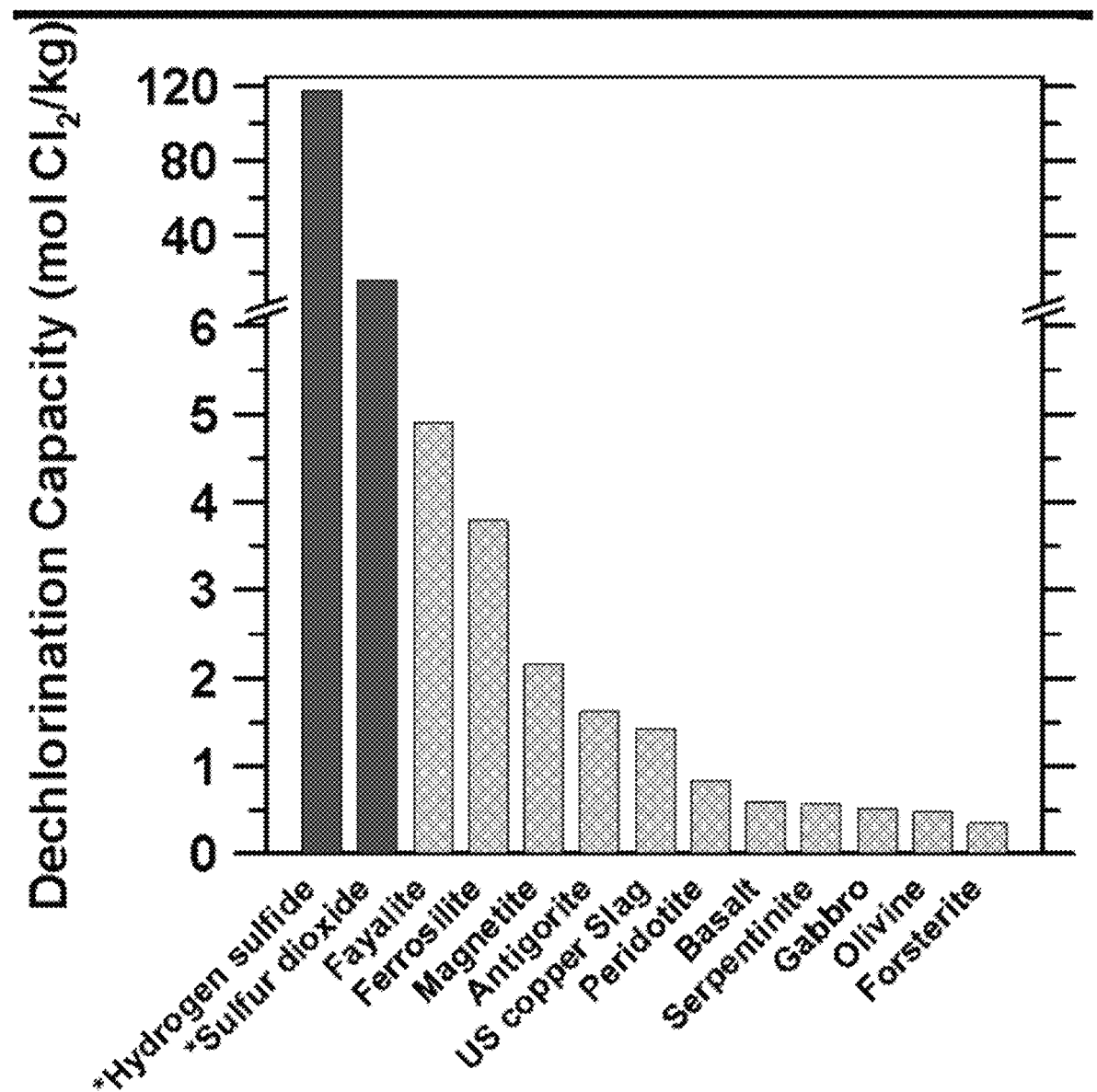
FIG. 3 shows the dechlorination capacity (mol $Cl_2$/kg solute) of various dechlorinating agents of the disclosure, established on the basis of their chemical composition. In general, a smaller quantity (mass) of solute is used as dechlorination capacity increases.

With ClER minimized upstream by OER-selective anode, the remaining chlorine and acid species in anolyte effluents may be further neutralized and/or removed (e.g., by downstream dechlorination and deacidification). In certain embodiments, based on a conservatively estimated OER efficiency of 90%, over 20-41 kilomole of $H^+$ (in acidified anolyte) accompanied by 1.1-2.3 kilomole of $Cl_2$ (or the hydrolyzed free-chlorine species: HClO and ClO⁻) will be produced for every tonne of $CO_2$ mineralized as bicarbonates/carbonates. Providing that the cathodic alkalinity will be entirely used for $CO_2$ mineralization, external sources of cheap, abundant, and relatively reactive materials may be used to re-alkalinize the anolyte. Moreover, once the anolyte is neutralized to a pH>6, the evolved $Cl_2$ can also be retained/reabsorbed as hydrolyzed species, enabling in-solution dechlorination approaches. There is a wide range of mineral mixtures (e.g., rocks, industrial wastes) that can be used as neutralization and, optionally, further alkalinization reagents. The choice of neutralization solute is based on two material parameters: a) the acid neutralization capacity which is established by the elemental composition, and b) the dissolution rate of the material which to the first order is dictated by the solution pH. Exemplary reagents are listed in Table S1 and shown in FIG. 2 and FIG. 3. The acid neutralization capacities of the exemplary reagents span an order of magnitude (5-to-50 mol $H^+$/kg), and some of these reagents are available in abundance in a granular form (e.g., fly ash reservoirs in the U.S. alone hold over 3 billion tonnes of residues). In addition, common ocean alkalinization minerals (e.g., those listed in Table S1) can be used to treat acidic anolyte.

Due to the strong oxidizing properties of chlorine and its hydrolyzed species (e.g., HClO, ClO⁻), free chlorine species find themselves in applications such as wastewater/gas treatments. The chlorinated anolyte can be dechlorinated via many waste treatment processes, such as 1) use in preventing biofouling of filtration membranes (e.g., the hypochlorite shock); 2) by mixing with wastewater to decontaminate organic and inorganic substances (cyanides, arsenic, heavy metals, etc.); 3) by scrubbing flue gases to oxidize harmful $H_2S$ and $SO_x$ (e.g., $SO_2$) and NOx (e.g., NO, $NO_2$) gases. Moreover, the ferrous iron ($Fe^{2+}$) or other low valent metal species (e.g., Mn, Ni, Cr, Ti, etc., or any combination thereof) naturally present in the minerals/rocks used for acid neutralization can also effectively reduce chlorine to chlorides, providing co-deacidification and dechlorination pathways. Similarly, solid industrial wastes such as copper slags are enriched in ferrous species (e.g., Fayalite) and alkali metal oxides that could potentially neutralize the acidity while reducing free chlorine (see FIG. 3).

Modifications to Systems of the Disclosure

Figure 5:
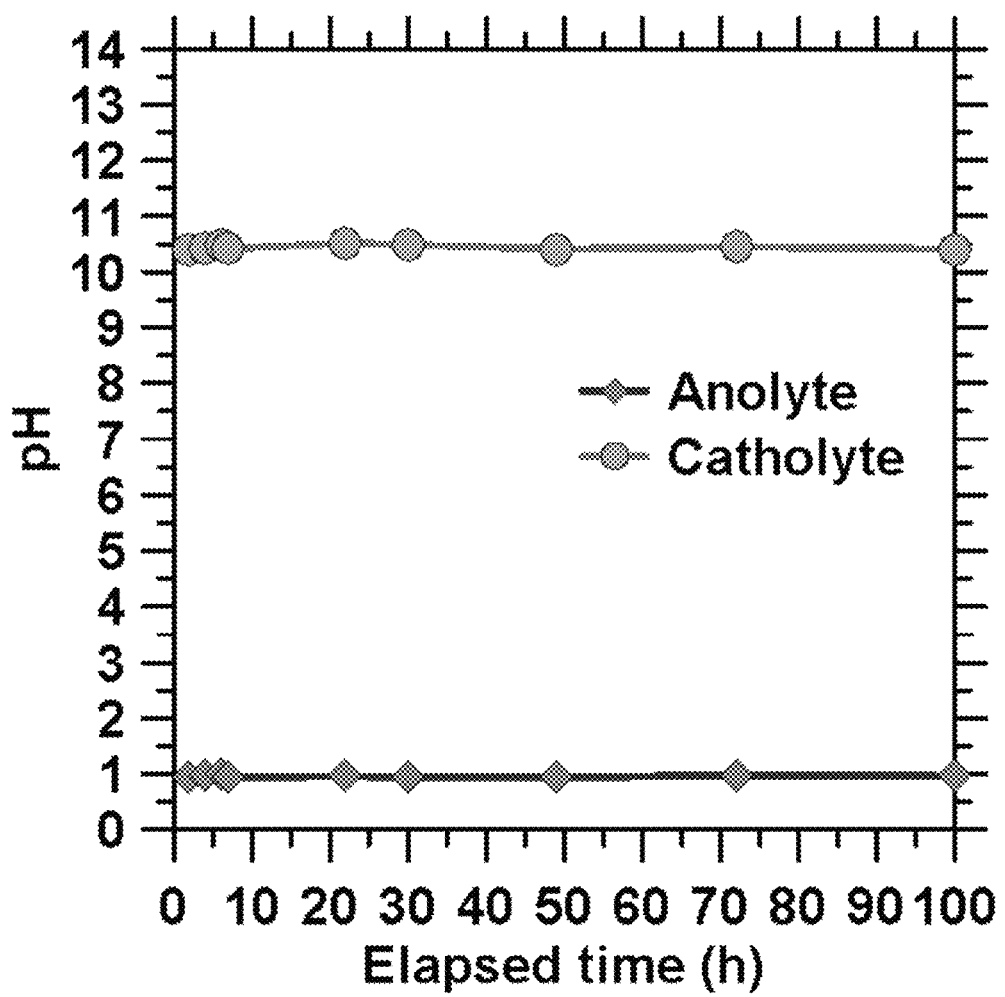
FIG. 5 shows the pH of each of the effluents recorded at various time points from the system shown in FIG. 4.
Figure 6:
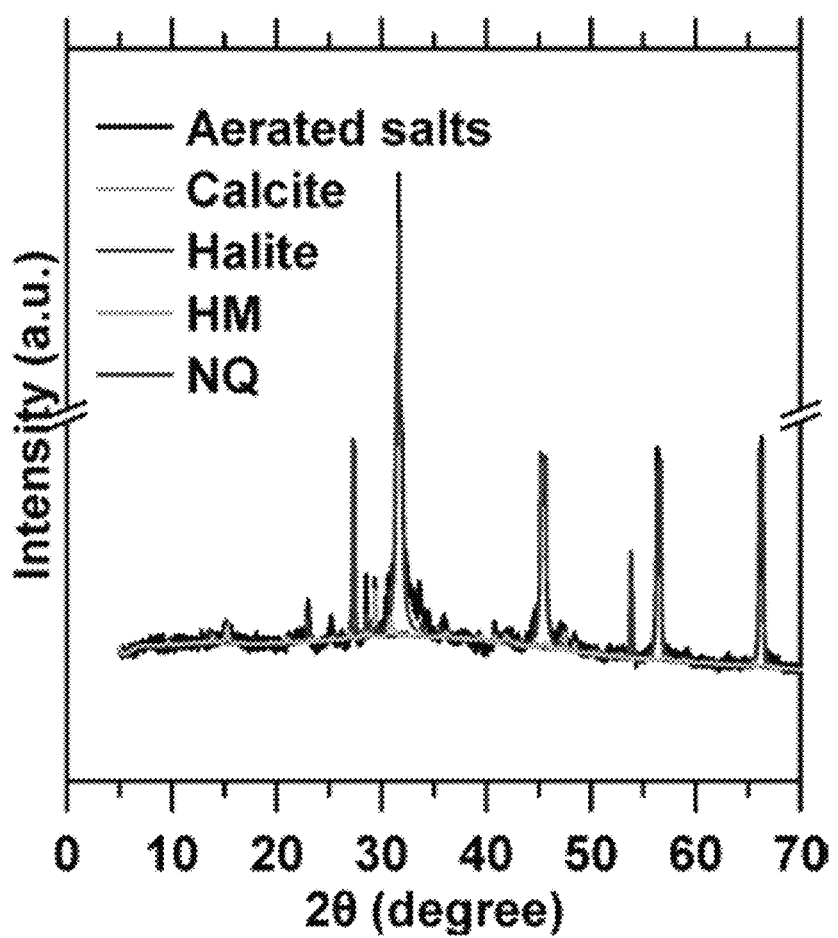
FIG. 6 shows the chemical composition of the precipitated solids from the cathodic chamber of the system shown in FIG. 4.
Figure 7:
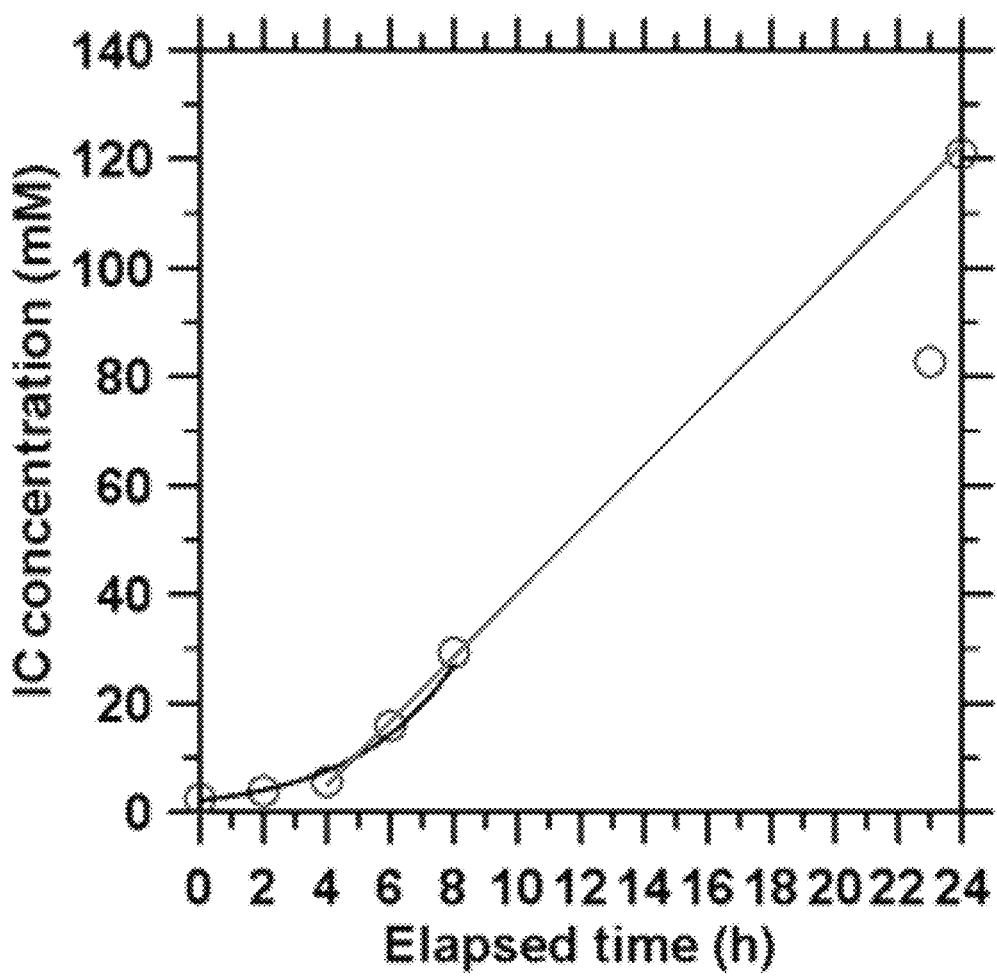
FIG. 7 shows the inorganic carbon (IC, e.g., $HCO_3^-$, $CO_3^{2+}$) concentration over time by continuously aerating the catholyte and cathodic chamber with 400 ppm $CO_2$ gas mixture.

Naturally enhanced aeration or surface area enhancement of the catholyte can be conducted by disposing the catholyte and the produced hydroxide into the ocean or land to ensure effective mixing and $CO_2$ equilibration. If released in ocean, the catholyte may act as a seawater alkalinization reagent to promote atmospheric $CO_2$ drawdown and to counter ocean acidification. In certain embodiments, carbonation of the catholyte can be performed in a separate carbonator or in the alkaline process chamber using atmospheric air or more concentrated $CO_2$ streams. As illustrated in FIG. 5 and FIG.

6, exemplary results show aeration of the catholyte and precipitates leads to $CO_2$ mineralization as both solid and aqueous species, even at a $CO_2$ concentration as low as 400 ppm (atmospheric).

Definitions

Unless otherwise defined herein, scientific and technical terms used in this application shall have the meanings that are commonly understood by those of ordinary skill in the art. Generally, nomenclature used in connection with, and techniques of, chemistry, chemical engineering, electrical engineering and civil engineering described herein, are those well-known and commonly used in the art.

The methods and techniques of the present disclosure are generally performed, unless otherwise indicated, according to conventional methods well known in the art and as described in various general and more specific references that are cited and discussed throughout this specification.

Chemistry terms used herein, unless otherwise defined herein, are used according to conventional usage in the art, as exemplified by "The McGraw-Hill Dictionary of Chemical Terms", Parker S., Ed., McGraw-Hill, San Francisco, C.A. (1985).

All publications, patents and published patent applications referred to in this application are specifically incorporated by reference herein. In case of conflict, the present specification, including its specific definitions, will control.

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

The terms "olivine" and "olivine rock" as used herein may refer to at least one of olivine, comprising Mg, Fe, and SiO4, and any of the various members of the "Olivine Group," which includes olivine, tephroite, monticellite, larnite and kirschsteinite. The above olivine species may further comprise other elements, such as, Mg, Fe, Mn, Al, Ti, Ca, Cr, Ni, Co. Olivine may be found in mafic and ultramafic igneous rock.

The terms "deacidifying," "deacidify," and "deacidification" as used herein refer to a process that results in an increase in pH of an aqueous solution.

A "deacidifying composition" herein refers to a composition that deacidifies a substrate. Deacidifying compositions include alkaline rocks and minerals containing carbonates, hydroxides, oxides, and/or silicates. As a non-limiting example, olivine rock may, in certain embodiments, be used as a deacidifying composition to deacidify a solution with a low pH.

"Free-chlorine species" as used herein may refer to any chemical compound that comprises or can generate chlorine atoms with an oxidation state greater than or equal to 0. As non-limiting examples, free-chlorine species of the disclosure include $Cl_2$, $ClO^-$, and $HClO$.

The terms "dechlorinate," and "dechlorination" as used herein refer to processes that result in the removal of Cl-containing compounds or ions from a substrate such as an aqueous solution.

In preferred embodiments, as a non-limiting example, dechlorination includes the chemical conversion of free-chlorine species (e.g., $Cl_2$, $ClO^-$, $HClO$, etc.) to chlorides ($Cl^-$) using a dechlorinating composition.

The term "dechlorinating composition" as used herein refers to a composition that facilitates the chemical transformation of free-chlorine species into chlorides.

The term "deacidifying and dechlorinating composition" as used here refers to a composition that advantageously deacidifies (e.g., induces an increase in pH of an aqueous solution and dechlorinates (e.g., facilitates the chemical transformation of free-chlorine species into chlorides) an aqueous solution.

The term "reductive species" as used herein refers to a chemical species which may interact with another chemical species and transfer at least one valence electron to the chemical species, thereby reducing the chemical species. Reductive species may include, but are not limited to, low-valent metallic species.

The term "low-valent metallic species" as used herein refers to chemical species, which exists in a formal oxidation state less than (i.e., lower than) at least one of the most common naturally-occurring non-zero oxidation states. As non-limiting examples, low-valent metal species described herein may include $Fe^0$, $Fe^{2+}$, $Mn^0$, $Mn^{3+}$, $Mn^{4+}$, $Ni^0$, $Ni^+$, and $Ni^{3+}$.

The term "alkalinizing" as used herein refers to a process of increasing the pH of a given solution, e.g., alkalinizing the first solution to prepare an alkaline solution with a higher pH.

The term "acidifying" or "acidification" as used herein refers to a process of decreasing the pH of a given solution. The given solution may be of any starting pH before undergoing the acidifying, e.g. the solution may already have a pH below 7 before a step of acidifying the solution is performed.

The term "ionic communication" as used herein refers to the ability for ions to freely flow between two objects or regions of an object, e.g., between the cathodic chamber and anodic chamber of an electrochemical cell, in accordance with local chemical gradients. Non-limiting examples of such gradients include flow of ions from an area of high electrical potential to low electrical potential, from high ion concentration to low ion concentration, and from high chemical potential to low chemical potential. In certain embodiments, two objects or regions may be physically separated by a semi-permeable barrier (e.g., not in fluid communication) but still be in ionic communication, e.g., by virtue of ion diffusion or transport through the barrier.

The term "homogeneous" when used herein to describe a surface, refers to a substantially flat or featureless surface, e.g., a surface having low mean area roughness (Sa). For example, a homogeneous surface of the disclosure may have a mean area roughness (Sa) of about 1.2 μm.

The term "particulate" when used herein to describe a surface, refers to a surface having particles (e.g., spheres) dispersed on the surface and/or adhered to it, such that the surface comprises the particles. For example, certain particulate surfaces of the disclosure consist essentially of MnOx spheres. Particulate surfaces of the disclosure will be more rough (e.g., have a higher mean area roughness, Sa) than homogeneous surfaces of the disclosure.

The terms "mean area roughness" and "Sa" as used herein refer to a 3-dimensional roughness measurement which represents the average roughness over a measurement area. The value of Sa is the arithmetical mean of the respective distances of a collection of points in the sample measurement (e.g., points on the anode surface) from a "mean plane" representing the average plane of all points in the measurement. Higher Sa values indicate that a surface is "more rough," or has a greater average absolute distance from the mean plane. Conversely, lower values of Sa indicate that a surface is "less rough," or more flat.

EXAMPLES

The invention now being generally described, it will be more readily understood by reference to the following examples which are included merely for purposes of illustration of certain aspects and embodiments of the present invention, and are not intended to limit the invention.

Example 1: Exemplary Deacidifying Agents

TABLE S1

List of exemplary deacidifying agents, their descriptions, and approximate moles of $H^+$ neutralized per kg of agent.

| Deacidifying Agent | Description | Mol $H^+$ neutralized per kg deacidifying agent |
|---|---|---|
| Periclase | MgO, a mineral found in metamorphic rocks | 49.63 |
| Lime | CaO, naturally occurring or synthetic | 35.66 |
| Lime Kiln Dust | By-product of lime manufacturing | 34.38 |
| Forsterite | $Mg_2SiO_4$, the Mg-endmember of olivine | 28.43 |
| Olivine | Group of nesosilicate minerals found in ultramafic rocks | 25.97 |
| Larnite | $Ca_2SiO_4$, a nesosilicate found in crystalline slags | 23.22 |
| Serpentinite | Ultramafic rock rich in serpentine, a hydrothermal alteration product of olivine | 22.96 |
| Basalt | Fine-grained mafic rock rich in plagioclase feldspar and pyroxene | 22.91 |
| Stainless steel slag | Semicrystalline by-product of metal manufacturing | 22.02 |
| Peridotite | Ultramafic rock rich in olivine with some pyroxene | 22.00 |
| Lizardite (Serpentine) | $Mg_3(Si_2O_5)(OH)_4$, a phyllosilicate | 21.65 |
| Ladle slag | Semicrystalline by-product of metal manufacturing | 20.40 |
| Blast furnace slag | Semicrystalline by-product of metal manufacturing | 19.97 |
| Diopside | $CaMgSi_2O_6$, a single-chained inosilicate (pyroxene) | 18.47 |
| Air-cooled blast furnace slag | Crystalline by-product of metal manufacturing | 17.78 |
| Wollastonite | $CaSiO_3$, a single-chained inosilicate | 17.22 |
| Basic oxygen furnace slag | Semicrystalline by-product of metal manufacturing | 16.85 |
| Brownmillerite | $Ca_2(Al,Fe^{3+})_2O_5$, a non-stoichiometric perovskite | 16.66 |
| Comingled electric arc furnace slag | Semi-crystalline by-product of metal manufacturing | 16.64 |
| Cement kiln dust | Amorphous by-product of Ordinary Portland Cement (OPC) production | 15.94 |
| Talc | $Mg_3Si_4O_{10}(OH)_2$, a phyllosilicate | 15.82 |
| Electric arc furnace slag | Semi-crystalline by-product of metal manufacturing | 15.08 |
| Class C fly ash | High-calcium fly ash from processing subbituminous and lignite coals | 13.59 |
| Reclaimed Class C fly ash | High-calcium fly ash reclaimed from landfill | 13.45 |
| Anorthite | $CaAl_2Si_2O_8$, Ca-endmember of plagioclase feldspar, a tectosilicate | 9.61 |
| Trona-rich fly ash | Fly ash containing $Na_3(CO_3)(HCO_3) \cdot 2H_2O$ | 9.44 |
| Bytownite | $Na_{0.2}Ca_{0.8}Al_{1.8}Si_{2.2}O_8$, a type of plagioclase feldspar, a solid solution of NaAlSi3O8 and CaAl2Si2O8 | 6.55 |
| Gabbro | Coarse-grained mafic rock rich in plagioclase feldspar and pyroxene | 6.48 |
| Anorthosite | Fine-grained mafic rock rich in anorthite | 5.65 |
| Albite | $NaAlSi_3O_8$, Na-endmember of plagioclase feldspar, a tectosilicate | 3.80 |
| Class F fly ash | Low-calcium fly ash from processing anthracite and bituminous coals | 1.91 |

Example 2: Results of an Exemplary $CO_2$ Removal System

Figure 4:
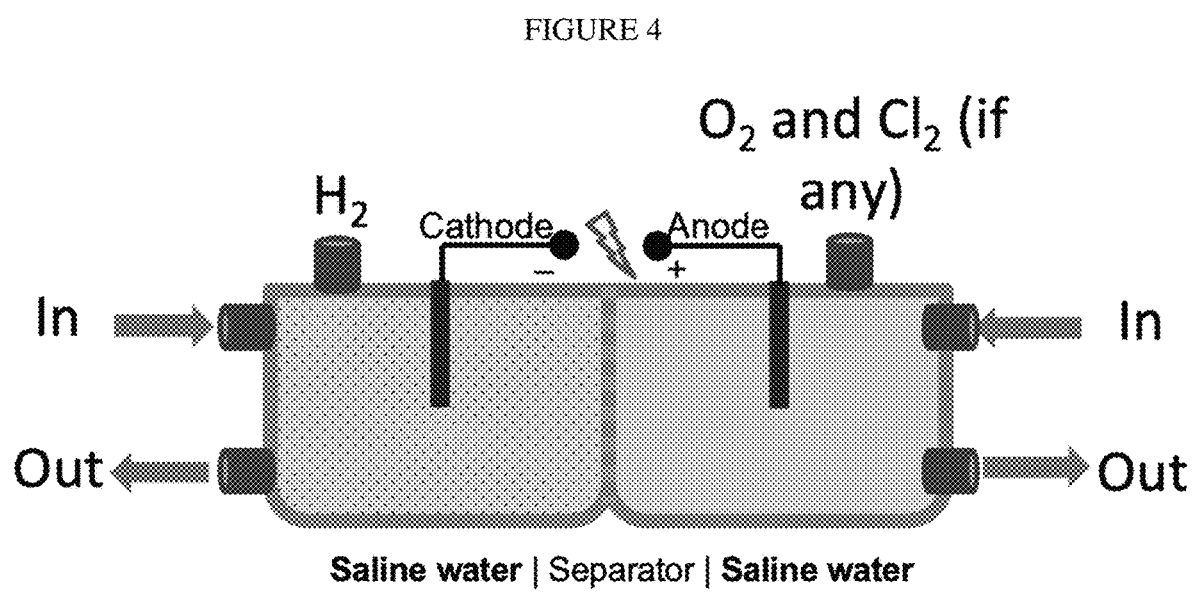
FIG. 4 shows a schematic drawing, in a cross-sectional view, of an exemplary flow-through, single-compartment electrolyzer.

An exemplary two-chamber flow-through reactor (e.g., FIG. 4) was employed with a porous diaphragm used to separate the anolyte and catholyte. Seawater was used to flow through the anolyte and catholyte chambers. 316 stainless steel mesh was used as the cathode, while a MnOx-coated titanium anode of the present disclosure was used as the anode. In the aforementioned set up, flowrates of catholyte and anolyte were identical and were controlled by a peristaltic pump. The catholyte pH was maintained at above 10 and the anolyte pH is below 2 through the application of a voltage to the electrode pair (FIG. 5).

Figure 8:
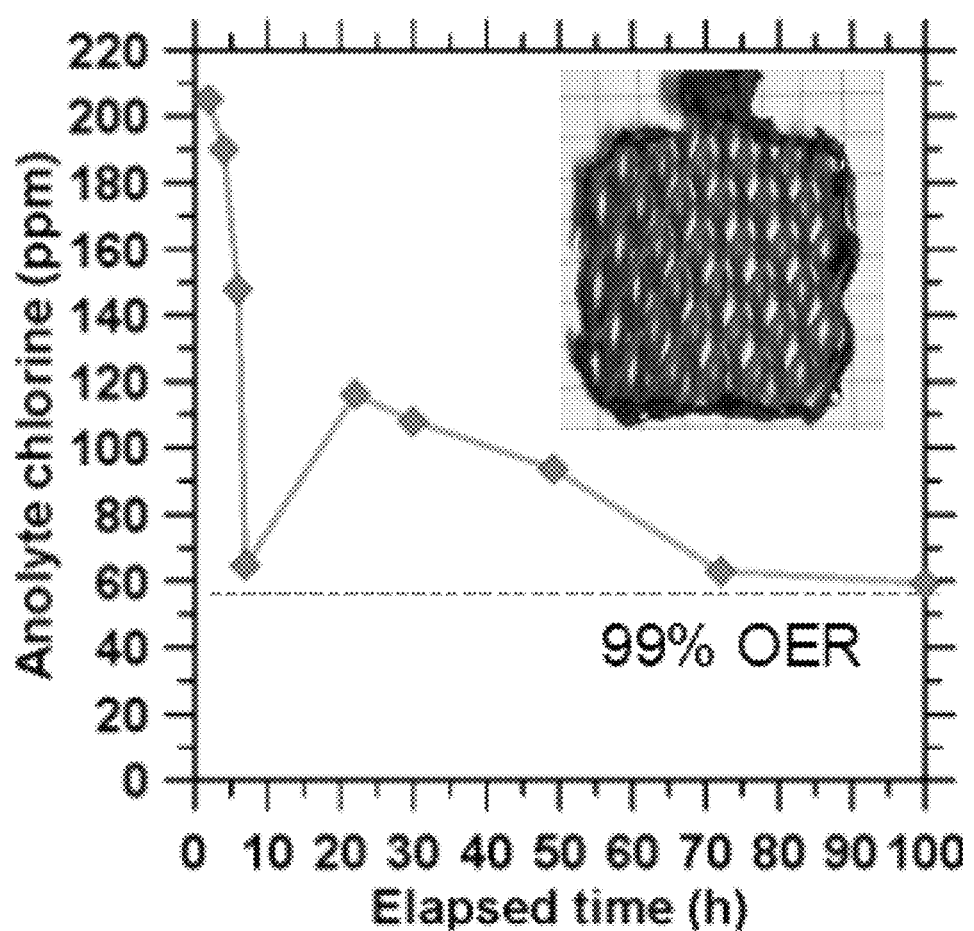
FIG. 8 shows the concentration of chlorine in the anolyte over time, and (inset) an exemplary Mn oxide-coated anode.
Figure 9:
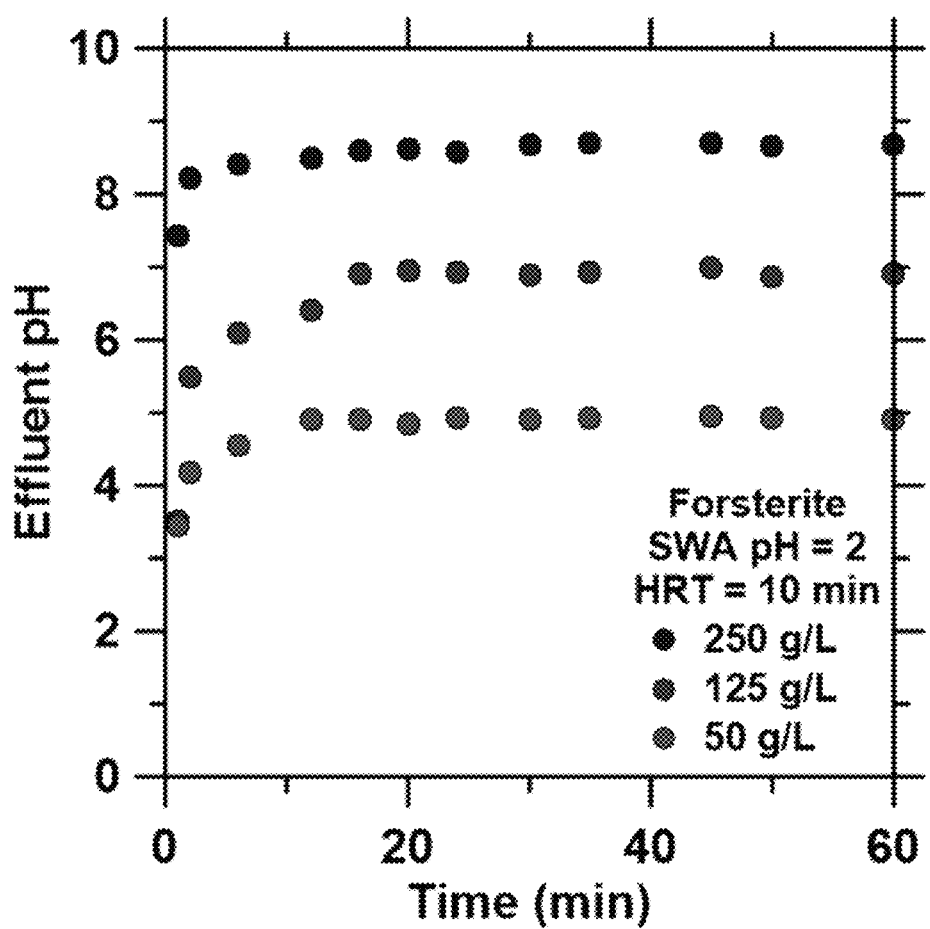
FIG. 9 shows the results of an exemplary continuously stirred reactor experiment using Forsterite-olivine and a hydraulic retention time of 10 minutes at varying solid/liquid ratios (50, 125, 250 g/L) with an acidified seawater (initial pH=2).

As for anolyte treatment, the use of the manganese oxide-coated anode (FIG. 8, inset) significantly reduced chlorine oxidation during the electrolysis process to approximately 99% (FIG. 8). The remaining free-chlorine species (<100 ppm) can be easily dechlorinated by aforementioned approaches or by using commercial reagents (e.g., activated carbon, $SO_2$, sulfite salts, etc.), rendering the grand carbon removal process free from generating oxidized chlorine species. In addition, FIG. 9 shows exemplary results of neutralizing the anolyte acidity by using an olivine rock (forsterite). Note that, >99% of the acidity (H+) were neutralized even at a low solid loading (50 g/L) under a hydraulic retention time of 10 mins.

Example 3: Synthesis of Exemplary Oxygen-Selective Anodes

Figure 10:
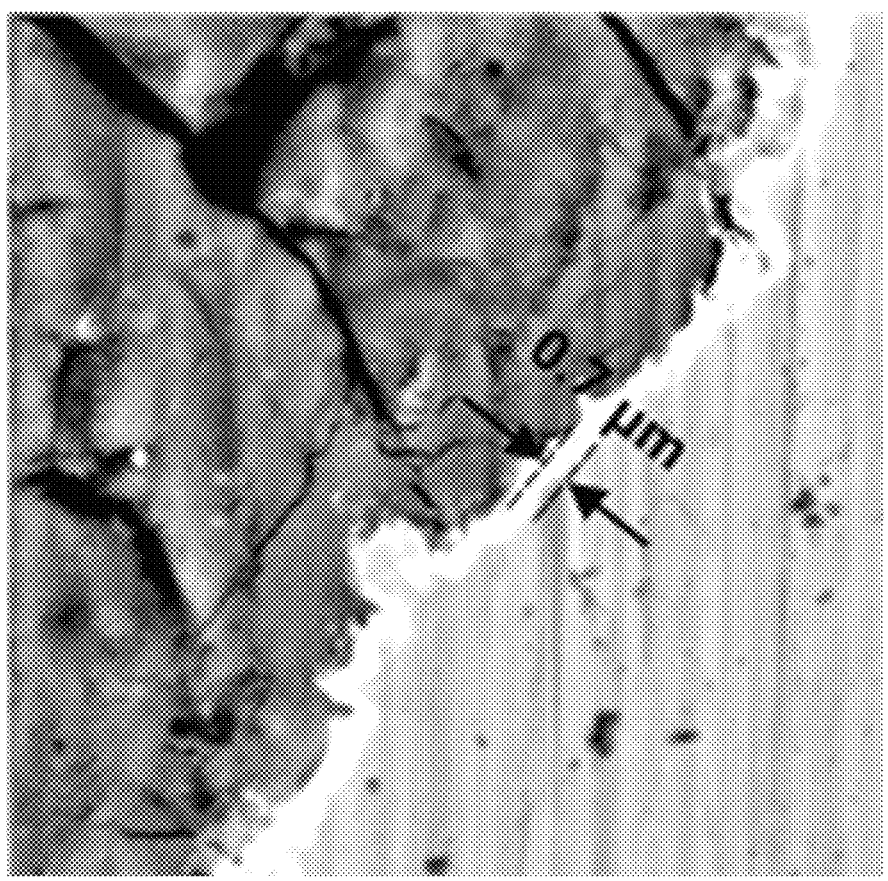
FIG. 10 shows exemplary coating of an Ir—Sn MMO (white) on a Ti substrate (gray) with approximate thickness of the MMO layer shown.
Figure 11:
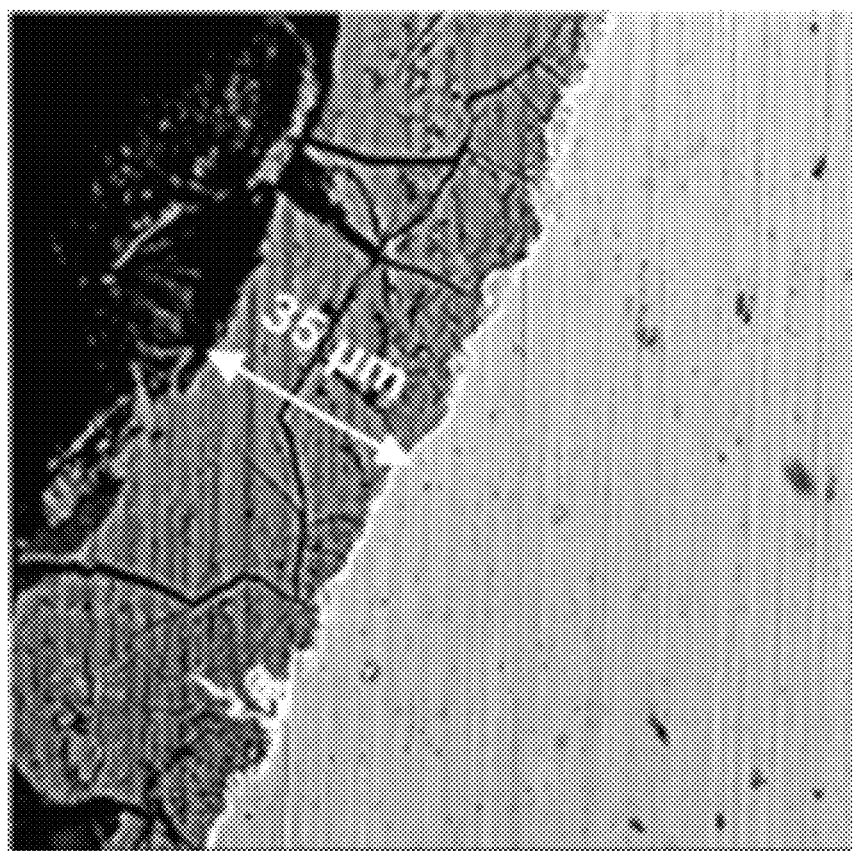
FIG. 11 shows exemplary coating of a Mn oxide outer layer (gray) on top of a Ir—Sn MMO layer (dark gray/black) with approximate thickness of the Mn oxide layer shown.
Figure 12:
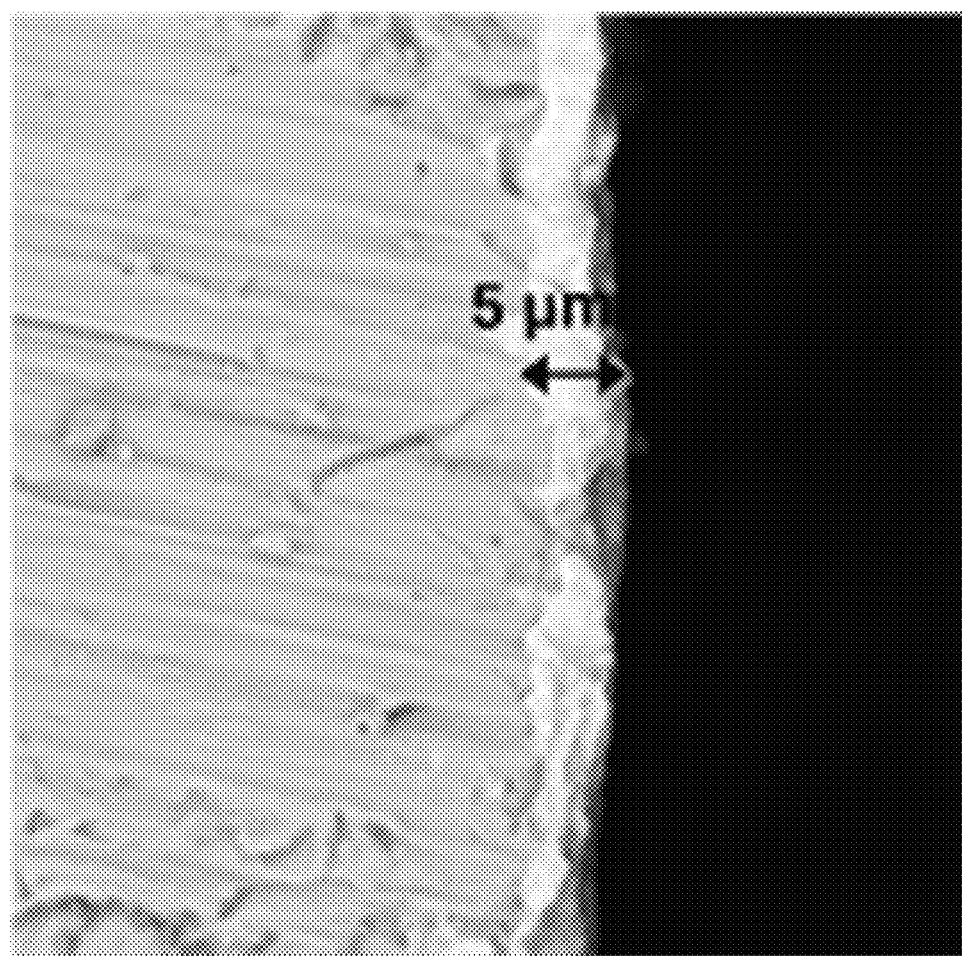
FIG. 12 shows exemplary coating of an Ir—Ta MMO (white) on a Ti substrate (gray) with approximate thickness of the MMO layer shown.
Figure 13:
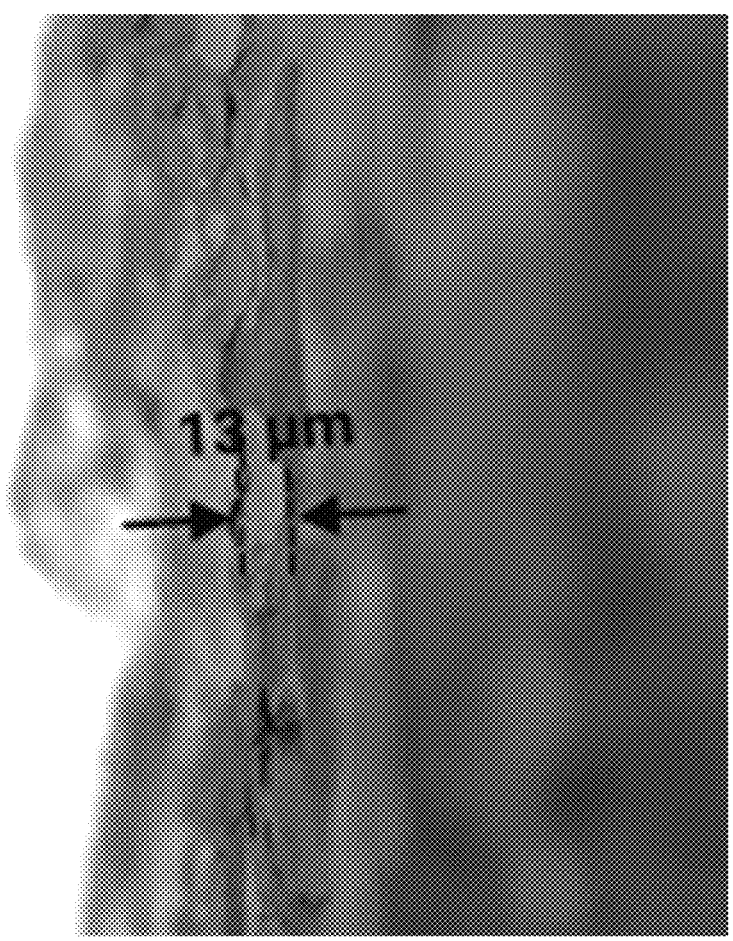
FIG. 13 shows exemplary coating of a Mn oxide outer layer (darker gray, in focus) on the Ir—Ta MMO surface (lighter gray, out of focus) with approximate thickness of the Mn oxide layer shown.
Figure 18:
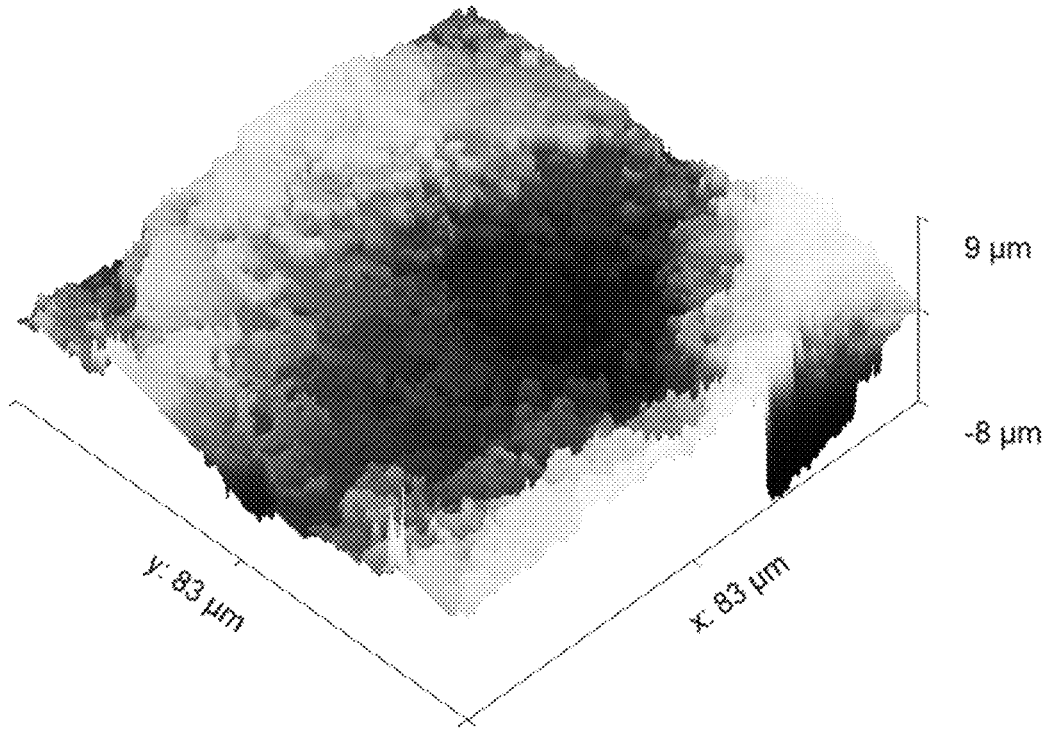
FIG. 18 shows exemplary surface morphology and roughness of the Mn oxide outer layer.
Figure 19:
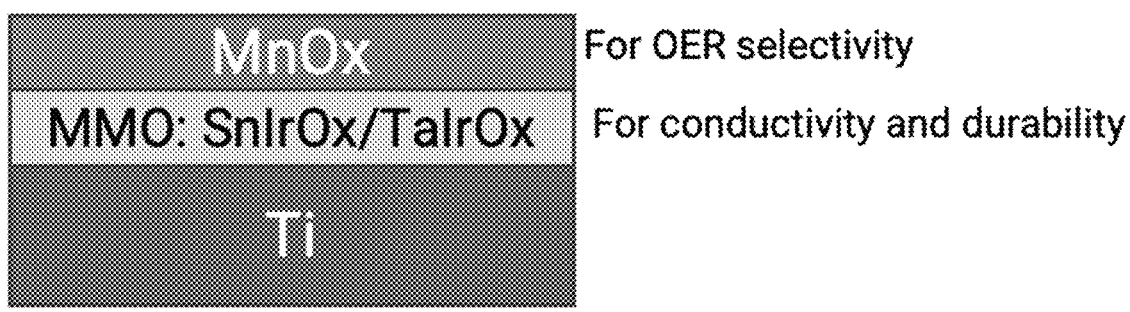
FIG. 19 shows schematic drawing of the exemplary arrangement of the Ti substrate, MMO inner layer and the Mn oxide outer layer.
Figure 20:
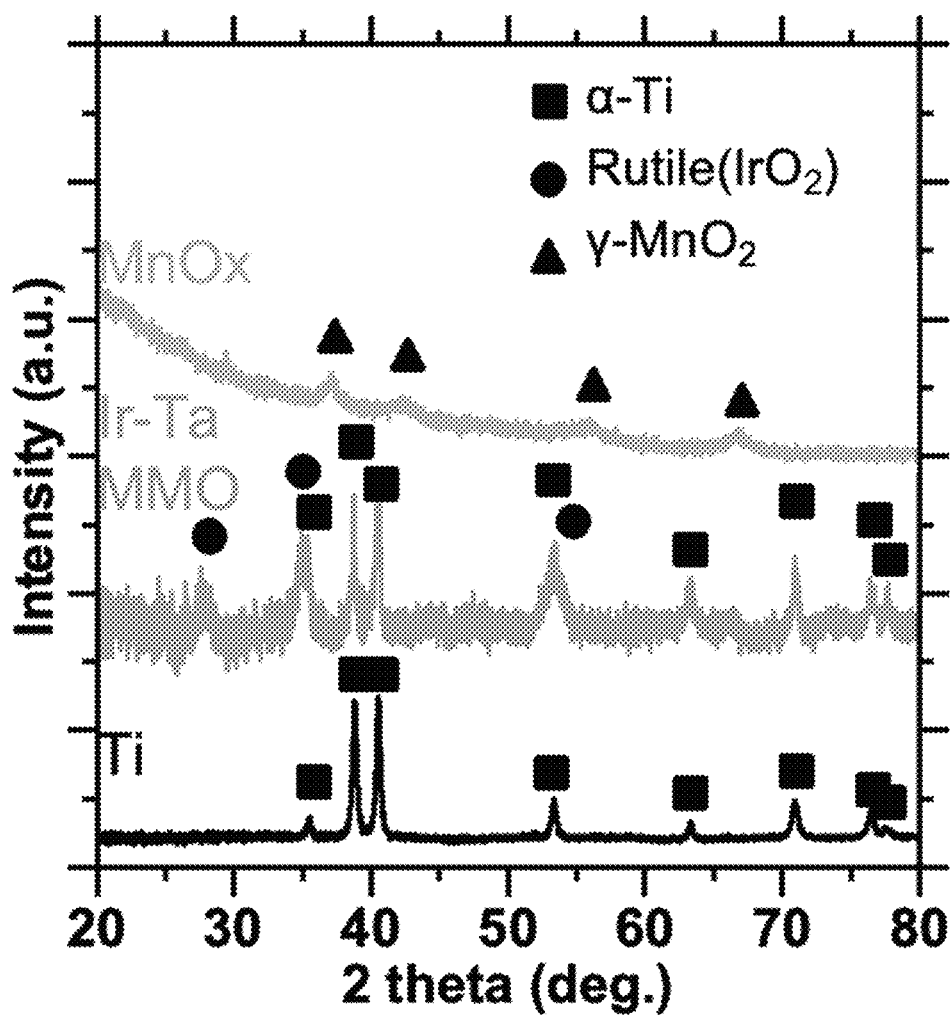
FIG. 20 shows X-Ray diffraction (XRD) phase analysis of the Ti substrate, Ir—Ta MMO inner layer and the Mn oxide outer layer.
Figure 21:
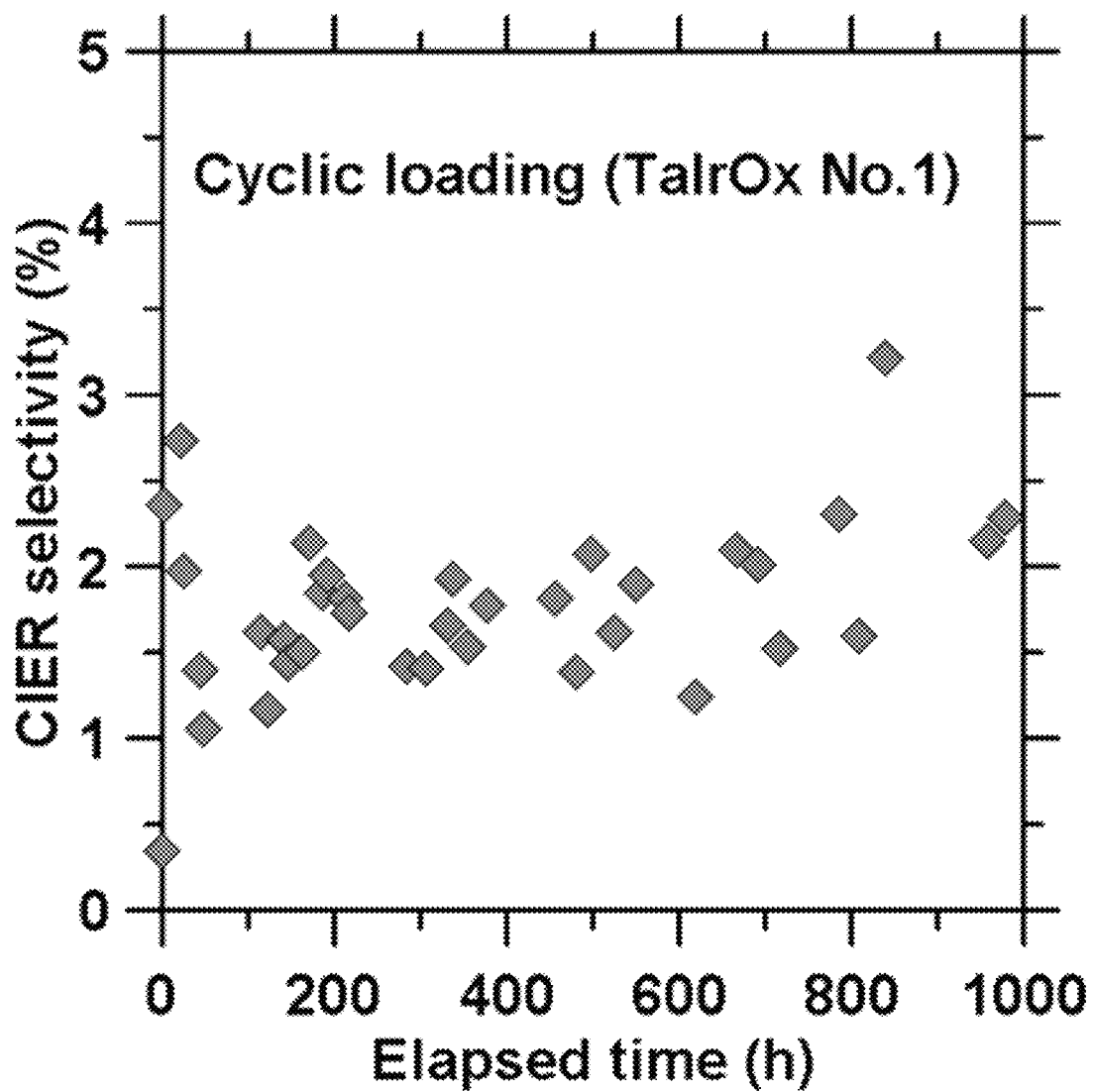
FIG. 21 shows testing of an exemplary oxygen-selective anode (comprising a TaIrOx MMO layer) of the disclosure in a representative electrolyzer cell.

The exemplary OER-selective anodes (shown in FIGS. 10-16) were fabricated by depositing a mixture of Mn, Mo, and Sn oxides on top of a titanium metal substrate coated with a layer of mixed metal oxides (MMO). The MMO intermediate layer was composed of a mixture of $IrO_2$ and $SnO_2$ (namely, Ir—Sn MMO, see FIGS. 10 and 14), or a mixture of $IrO_2$ and $Ta_2O_5$ (namely, Ir—Ta MMO, see FIGS. 12 and 15). The titanium substrates coated with Ir—Sn MMO or Ir—Ta MMO were subsequently placed in an electrodeposition bath solution comprising $H_2SO_4$, $MnSO_4$, $Na_2MoO_4$, and $SnCl_4$. Pt-coated titanium meshes were also placed in the bath as the cathode, and a porous hydrophilic PVDF, or a porous ceramic separator/diaphragm were placed in between the MMO-coated Ti (anode) and the Pt-coated Ti (cathode). Thereafter, the bath was heated to 90° C. and the MMO-coated Ti was anodically polarized to achieve a current density of 600 A/m² for 30 minutes. The electrodeposition procedure was repeated as needed with the bath solution replaced in between each time. Consequently, this procedure generally results in MnOx coatings of from about 0.1 μm to about 50 μm thick, that grow on top of the MMO coatings (see FIGS. 11, 13, and 16-20). X-Ray Diffraction (XRD) (FIG. 20) characterizations shows the MnOx coating is composed of ramsdellite (γ-$MnO_2$), with an Ir—Ta layer having a rutile structure. High-resolution SEM images (FIG. 17) characterizations shows ramsdellite (γ-$MnO_2$) is in the form of micro-spheres with diameters ranging from 0.79-2.3 μm. As shown in FIG. 18, the γ-$MnO_2$ microspheres contribute to an expansion of surface area ~1.5 times compared to the geometrical surface area. The γ-$MnO_2$ spheres feature nanostructured surfaces that increase the electrode-electrolyte contact area.

Example 4: Synthesis of Exemplary Oxygen-Selective Anodes

The exemplary OER-selective anodes (shown in FIGS. 10-16) were fabricated by depositing Mn oxides on top of a titanium metal substrate coated with a layer of mixed metal oxides (MMO). The MMO intermediate layer was composed of a mixture of $IrO_2$, $SnO_2$, and $Ta_2O_5$ (namely, Ir—Ta MMO, see FIGS. 12 and 15). The titanium substrates coated with Ir—Ta—Sn MMO were subsequently placed in an electrodeposition bath solution comprising $H_2SO_4$ and $MnSO_4$. Pt-coated titanium meshes were also placed in the bath as the cathode, and a porous hydrophilic PVDF, or a porous ceramic separator/diaphragm were placed in between the MMO-coated Ti (anode) and the Pt-coated Ti (cathode). Thereafter, the bath was heated to 90° C. and the MMO-coated Ti was anodically polarized to achieve a current density of 600 A/m² for 30 minutes. The electrodeposition procedure was repeated as needed with the bath solution replaced in between each time. Consequently, this procedure generally results in MnOx coatings of from about 0.1 μm to about 50 μm thick, that grow on top of the MMO coatings (see FIGS. 11, 13, and 16-20). X-Ray Diffraction (XRD) (FIG. 20) characterizations shows the MnOx coating is composed of ramsdellite (γ-$MnO_2$), with an Ir—Ta—Sn layer having a rutile structure. High-resolution SEM images (FIG. 17) characterizations shows ramsdellite (γ-$MnO_2$) is in the form of micro-spheres with diameters ranging from 0.79-2.3 μm. As shown in FIG. 18, the γ-$MnO_2$ microspheres contribute to an expansion of surface area ~1.5 times compared to the geometrical surface area. The γ-$MnO_2$ spheres feature nanostructured surfaces that increase the electrode-electrolyte contact area. The nanostructured γ-$MnO_2$ spheres predominate the surface if using a low $H_2SO_4$ concentration (e.g., 0.1 to about 1.9 M) in the plating bath, whereas the high $H_2SO_4$ concentration (about 2 M to about 6 M, up to about 18 M) plating bath promotes a more flat (homogeneous) MnOx coating surface (FIG. 23A).

Example 5: ALT Testing of Exemplary Anodes with Varying Morphologies

The $H_2SO_4$ content in the electroplating precursor was varied, and ALT experiments were conducted, to observe the impact the MnOx coating composition and morphology. A series of selected $H_2SO_4$ concentrations between about 0.1 and about 18M were tested in the plating bath. The resultant ALT lifetime and predicted lifetime values were discretized into the following categories: ALT lifetime: + (100 h-300 h); ++ (300 h-600 h), +++ (600 h-900 h), and ++++ (900 h-1200 h); predicted lifetime: * (1000 h-3000 h),  (3000 h-5000 h), * (5000 h-7000 h), and **** (7000 h-9000 h). Exemplary results are provided in Table 4 for anodes having a substantially flat (homogeneous) surface, prepared by plating at higher $H_2SO_4$ concentrations, and for anodes having a particulate surface, prepared by plating at lower $H_2SO_4$ concentrations. The lower $H_2SO_4$ results in a particulate MnOx coating morphology, whereas the higher concentration $H_2SO_4$ plating bath promotes a more homogenous appearance (FIG. 23A). Preliminary ALT experiments showed the two coatings behave very similarly up to about the 200 hour mark (including stage I, stage II, and the beginning of stage III), but the anode with the particulate coating exhibits a slower degradation rate towards the end of stage III. If given a (arbitrary) threshold of CIER selectivity of 5%, the ALT life is determined as + for cyclic and constant voltage conditions, respectively, leading to a predicted lifetime in the * category. The combination of the homogeneous MnOx layer with substrate 3 yielded the best performance in the Accelerated Lifetime Testing.

The ALT (experimental) lifetimes and predicted lifetimes of the tested electrodes are tabulated in Table S5:

TABLE S5

ALT life and predicted OER life for exemplary PGM-based anodes.

| ALT Test ID | ALT-1 | ALT-2 | ALT-3 | ALT-4 |
|---|---|---|---|---|
| MnOx morphology | homogeneous | homogeneous | homogeneous | particulate |
| Voltage loading | cyclic | constant | constant | constant |
| Substrate | 2 | 2 | 3 | 2 |
| ALT life (h) | + | + | ++++ | ++ |
| Predicted life (h) | * | * | **** | * |

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. An anode comprising:
   a substrate;
   a mixed metal oxide (MMO) layer disposed on the substrate; and
   an outer layer disposed on the MMO layer;
   wherein:
   the substrate comprises a conductive or semi-conductive material;
   the MMO layer comprises at least one element selected from the elements of groups 3, 4, 5, 6, 7, 8, 9, 10, 11, 12, 13 and 14; and
   the outer layer comprises manganese and oxygen.

2. The anode of claim 1, wherein the MMO layer comprises a first metal oxide comprising Pt, Pd, Rh, V, Cr, Mn, Fe, Co, Ni, Cu, Zn, Zr, Nb, Mo, Hf, W, Re, Os, Au, Ta, Ru, Ti, Y, Sr, Sn, La, Ce or Ir.

3. The anode of claim 1, wherein the MMO layer further comprises a second metal oxide comprising Pt, Pd, Rh, V, Cr, Mn, Fe, Co, Ni, Cu, Zn, Zr, Nb, Mo, Hf, W, Re, Os, Au, Ta, Ru, Ti, Y, Sr, Sn, La, Ce, or Ir.

4. The anode of claim 1, wherein the MMO layer comprises Ta, Ir, and O.

5. The anode of claim 1, wherein the MMO layer comprises Sn, Ir, and O.

6. The anode of claim 1, wherein the MMO layer comprises Ta, Ru, and O.

7. The anode of claim 1, wherein the MMO layer comprises Sn, Ru, and O.

8. The anode of claim 1, wherein the MMO layer comprises Co, Mn, and O.

9. The anode of claim 1, further comprising a dopant selected from Ti, Mo, Ru, W, Sr, Sn, Mn, Ta, Co, and Nb, or a combination thereof.

10. The anode of claim 1, wherein the MMO layer comprises a third metal oxide comprising Pt, Pd, Rh, V, Cr, Mn, Fe, Co, Ni, Cu, Zn, Zr, Nb, Mo, Hf, W, Re, Os, Au, Ta, Ru, Ti, Y, Sr, Sn, La, Ce, or Ir.

11. The anode of claim 1, wherein the MMO layer comprises Co, Mo, Sn, and O.

12. The anode of claim 2, wherein the MMO layer comprises the first metal oxide at about 10 mol %, about 20 mol %, about 30 mol %, about 40 mol %, about 50 mol %, or about 60 mol %.

13. The anode of claim 3, wherein the MMO layer comprises the second metal oxide at about 0.5 mol %, about 1.0 mol %, about 1.5 mol %, about 2.0 mol %, about 2.5 mol %, or about 3.0 mol %.

14. The anode of claim 10, wherein the MMO layer comprises the third metal oxide at about 0.001 mol %, about 0.002 mol %, about 0.003 mol %, about 0.004 mol %, about 0.005 mol %, about 0.006 mol %, about 0.007 mol %, or about 0.008 mol %.

15. The anode of claim 2, wherein the MMO layer comprises oxygen at about 10 mol %, about 20 mol %, about 30 mol %, about 40 mol %, about 50 mol %, or about 60 mol %.

16. The anode of claim 2, wherein the MMO layer comprises the first metal oxide at about 10 wt %, about 20 wt %, about 30 wt %, about 40 wt %, about 50 wt %, or about 60 wt %.

17. The anode of claim 3, wherein the MMO layer comprises the second metal oxide at about 0.5 wt %, about 1.0 wt %, about 1.5 wt %, about 2.0 wt %, about 2.5 wt %, or about 3.0 wt %.

18. The anode of claim 10, wherein the MMO layer comprises the third metal oxide at about 0.001 wt %, about 0.002 wt %, about 0.003 wt %, about 0.004 wt %, about 0.005 wt %, about 0.006 wt %, about 0.007 wt %, or about 0.008 wt %.

19. The anode of claim 1, wherein the MMO layer comprises oxygen at about 10 wt %, about 20 wt %, about 30 wt %, about 40 wt %, about 50 wt %, or about 60 wt %.

20. The anode of claim 1, wherein the MMO layer comprises from about 5 atomic % (at. %) Ir to about 65 at. % Ir, 17 at. % Ir to about 65 at. % Ir, or about 15 at. % to about 30 at. % Ir.

21. The anode of claim 1, wherein the outer layer has a thickness from about 0.1 μm to about 500 μm.

22. The anode of claim 1, wherein the MMO layer has thickness from about 0.1 μm to about 500 μm.

23. The anode of claim 1, wherein the outer layer comprises Mn, Mo, Ta, La, Ce, or Sn, or a combination thereof.

24. The anode of claim 1, wherein the outer layer further comprises an outer layer dopant.

25. The anode of claim 1, wherein the MMO layer comprises one or more additional MMO layers, wherein the additional MMO layer(s) comprises a metal oxide comprising Ta, Ru, Ti, Y, Sr, Sn, La, Ce or Ir.

26. The anode of claim 1, wherein the outer layer has a surface morphology comprising spheres, wherein the spheres have a diameter from 0.01 μm to 10 μm.

27. The anode of claim 1, wherein the outer layer has a surface having a mean area roughness (Sa) of from about 1 μm to about 10 μm.

28. The anode of claim 1, wherein the outer layer has a surface having a mean area roughness (Sa) of from about 0 μm to about 1 μm.

29. An electrochemical cell comprising:
  (a) a cathodic chamber comprising:
    a cathode
    a cathodic gas outlet;
    a first solution inlet; and
    an alkaline solution outlet;
    wherein the cathode is disposed inside the cathodic chamber and coupled to a power source; and
  (b) an anodic chamber comprising:
    an anode of claim 1;
    an anodic gas outlet;
    a second solution inlet; and
    an acidic solution outlet;
    wherein the anode is disposed inside the anodic chamber and coupled to a power source.

30. The anode of claim 1, wherein, when a voltage is applied to the anode and the anode is contacted with an aqueous solution comprising chloride, $O_2$ and $H^+$ and/or $H_3O^+$ ions are produced selectively at the anode.

\* \* \* \* \*